US011942688B2

(12) United States Patent
Welsh et al.

(10) Patent No.: US 11,942,688 B2
(45) **Date of Patent: *Mar. 26, 2024**

(54) CONFORMAL/OMNI-DIRECTIONAL DIFFERENTIAL SEGMENTED APERTURE

(71) Applicant: Battelle Memorial Institute, Columbus, OH (US)

(72) Inventors: Raphael Joseph Welsh, Powell, OH (US); Douglas A. Thornton, Upper Arlington, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,559

(22) Filed: Feb. 3, 2023

(65) Prior Publication Data

US 2023/0187841 A1 Jun. 15, 2023

Related U.S. Application Data

(63) Continuation of application No. 16/857,912, filed on Apr. 24, 2020, now Pat. No. 11,605,899.

(Continued)

(51) Int. Cl.

*H04L 27/12* (2006.01)
*H01Q 17/00* (2006.01)
*H01Q 21/06* (2006.01)

(52) U.S. Cl.

CPC ......... *H01Q 17/008* (2013.01); *H01Q 21/061* (2013.01)

(58) Field of Classification Search

CPC ........... H04L 27/04; H04L 27/12; H01Q 3/24; H01Q 19/30

(Continued)

(56) References Cited

U.S. PATENT DOCUMENTS 2,628,311 A 2/1953 Lindenblad
5,220,330 A 6/1993 Salvail et al.

(Continued)

FOREIGN PATENT DOCUMENTS

JP H01 254007 A 10/1989
WO WO 2005/094352 A2 10/2005

OTHER PUBLICATIONS

International Search Report for PCT Application No. PCT/US2020/070004 dated Aug. 19, 2020.

*Primary Examiner* — Khai Tran
(74) *Attorney, Agent, or Firm* — Lippes Mathias LLP

(57) ABSTRACT

A radio frequency (RF) aperture includes an array of electrically conductive tapered projections arranged to define a curved aperture surface, such as a semi-cylinder aperture surface, or a cylinder aperture surface (which may be constructed as two semi-circular aperture surfaces mutually arranged to define the cylinder aperture surface). The RF aperture may further include a top array of electrically conductive tapered projections arranged to define a top aperture surface. The top aperture surface may be planar, and a cylinder axis of cylinder aperture surface may be perpendicular to the plane of the planar top aperture surface. The RF aperture may further include baluns mounted on at least one printed circuit board, each having a balanced port electrically connected with two neighboring electrically conductive tapered projections of the array and further having an unbalanced port.

13 Claims, 16 Drawing Sheets

Related U.S. Application Data

(60) Provisional application No. 62/839,122, filed on Apr. 26, 2019.

(58) Field of Classification Search
USPC .............................. 375/304; 342/4, 700, 753
See application file for complete search history.

(56) References Cited

U.S. PATENT DOCUMENTS

| | | | | |
|---|---|---|---|---|
| 6,227,685 | B1 * | 5/2001 | McDermott | F21K 9/68 362/255 |
| 7,307,579 | B2 | 12/2007 | Rees et al. | |
| 7,420,522 | B1 | 9/2008 | Steinbrecher | |
| 7,605,768 | B2 | 10/2009 | Ebling et al. | |
| 7,631,414 | B2 | 12/2009 | Quil et al. | |
| 8,564,491 | B2 | 10/2013 | Peng | |
| 10,056,699 | B2 | 8/2018 | Elsallal | |
| 10,340,606 | B2 | 7/2019 | Elsallal | |
| 10,749,258 | B1 * | 8/2020 | West | H04B 7/0617 |
| 2005/0285808 | A1 | 12/2005 | Holter | |
| 2007/0195004 | A1 | 8/2007 | Rebeiz et al. | |
| 2009/0303147 | A1 | 12/2009 | Choudhury | |
| 2013/0082890 | A1 | 4/2013 | Wang et al. | |
| 2015/0323659 | A1 | 11/2015 | Mitchell | |
| 2019/0214722 | A1 | 7/2019 | Di Paola et al. | |
| 2019/0227205 | A1 * | 7/2019 | Gubela | B29D 11/0074 |

* cited by examiner

Control Modes:

1. All Ns and Ms are in transmit mode
2. All Ns and Ms are in receive mode
3. All Ns are in transmit mode and all Ms are in receive mode
4. All Ns are in receive mode and all Ms are in transmit mode

CONFORMAL/OMNI-DIRECTIONAL DIFFERENTIAL SEGMENTED APERTURE

This application is a continuation of U.S. Ser. No. 16/857,912 filed Apr. 24, 2020 and titled "CONFORMAL/OMNI-DIRECTIONAL DIFFERENTIAL SEGMENTED APERTURE" and now issued as U.S. Pat. No. 11,605,899, which claims the benefit of U.S. Provisional Application No. 62/839,122 filed Apr. 26, 2019 and titled "CONFORMAL/OMNI-DIRECTIONAL DIFFERENTIAL SEGMENTED APERTURE". U.S. Ser. No. 16/857,912 filed Apr. 24, 2020 and U.S. Provisional Application No. 62/839,122 filed Apr. 26, 2019 are incorporated herein by reference in their entirety.

BACKGROUND

The following relates to the radio frequency (RF) arts, RF transmitter arts, RF receiver arts, RF transceiver arts, broadband RF transmitter, receiver, and/or transceiver arts, RF communications arts, and related arts.

Steinbrecher, U.S. Pat. No. 7,420,522 titled "Electromagnetic Radiation Interface System and Method" discloses a broadband RF aperture as follows: "An electromagnetic radiation interface is provided that is suitable for use with radio wave frequencies. A surface is provided with a plurality of metallic conical bristles. A corresponding plurality of termination sections are provided so that each bristle is terminated with a termination section. The termination section may comprise an electrical resistance for capturing substantially all the electromagnetic wave energy received by each respective bristle to thereby prevent reflections from the surface of the interface. Each termination section may also comprise an analog to digital converter for converting the energy from each bristle to a digital word. The bristles may be mounted on a ground plane having a plurality of holes therethrough. A plurality of coaxial transmission lines may extend through the ground plane for interconnecting the plurality of bristles to the plurality of termination sections."

Certain improvements are disclosed herein.

BRIEF SUMMARY

In accordance with some illustrative embodiments a radio frequency (RF) aperture comprises an array of electrically conductive tapered projections arranged to define a curved aperture surface. In some embodiments the array of electrically conductive tapered projections are arranged to define a semi-cylinder aperture surface. In some embodiments, the array of electrically conductive tapered projections are arranged to define a cylinder aperture surface. In these latter embodiments, the array of electrically conductive tapered projections may include a first array of electrically conductive tapered projections arranged to define a first semi-cylinder aperture surface, and a second array of electrically conductive tapered projections arranged to define a second semi-cylinder aperture surface, in which the first and second semi-cylinder aperture surfaces are mutually arranged to define the cylinder aperture surface. In some embodiments employing the cylindrical aperture surface, the RF aperture further comprises a top array of electrically conductive tapered projections arranged to define a top aperture surface. In some such embodiments, the top aperture surface is a planar top aperture surface, and in some more specific embodiments a cylinder axis of cylinder aperture surface is perpendicular to the plane of the planar top aperture surface.

In accordance with some illustrative embodiments disclosed herein, an RF aperture comprises: an array of electrically conductive tapered projections arranged to define a curved aperture surface; at least one printed circuit board; baluns mounted on the at least one printed circuit board wherein each balun has a balanced port electrically connected with two neighboring electrically conductive tapered projections of the array of electrically conductive tapered projections and further has an unbalanced port; and RF circuitry disposed on the at least one printed circuit board and electrically connected with the unbalanced ports of the baluns. In some embodiments, the array of electrically conductive tapered projections are arranged to define a semi-cylinder aperture surface. In some embodiments, the array of electrically conductive tapered projections are arranged to define a cylinder aperture surface.

Some embodiments of the RF aperture of the immediately preceding paragraph in which the array of electrically conductive tapered projections are arranged to define a cylinder aperture surface are constructed as follows. The array of electrically conductive tapered projections includes a first array of electrically conductive tapered projections arranged to define a first semi-cylinder aperture surface and a second array of electrically conductive tapered projections arranged to define a second semi-cylinder aperture surface, in which the first and second semi-cylinder aperture surfaces are mutually arranged to define the cylinder aperture surface. In some such embodiments, the at least one printed circuit board includes a first at least one printed circuit board carrying a first subset of the baluns whose balanced ports are electrically connected with the first array of electrically conductive tapered projections, and a second at least one printed circuit board carrying a second subset of the baluns whose balanced ports are electrically connected with the second array of electrically conductive tapered projections. In some such embodiments: the first at least one printed circuit board is planar, and the balanced ports of the first subset of the baluns are electrically connected with the first array of electrically conductive tapered projections by coaxial cables; and the second at least one printed circuit board is planar, and the balanced ports of the second subset of the baluns are electrically connected with the second array of electrically conductive tapered projections by coaxial cables.

In embodiments of either one of the two immediately preceding paragraphs in which the array of electrically conductive tapered projections are arranged to define a cylinder aperture surface, the RF aperture may optionally further comprise: a top array of electrically conductive tapered projections arranged to define a top aperture surface; at least one top printed circuit board; and baluns mounted on the at least one top printed circuit board wherein each balun mounted on the at least one top printed circuit board has a balanced port electrically connected with two neighboring electrically conductive tapered projections of the top array of electrically conductive tapered projections and further has an unbalanced port. In some such embodiments, the top aperture surface is a planar top aperture surface, and optionally a cylinder axis of cylinder aperture surface is perpendicular to the plane of the planar top aperture surface.

In accordance with some illustrative embodiments disclosed herein, an RF aperture comprises: an array of electrically conductive tapered projections arranged to define a curved aperture surface; at least one printed circuit board; and RF circuitry disposed on the at least one printed circuit board and electrically connected with the electrically conductive tapered projections. In some such embodiments, the array of electrically conductive tapered projections are arranged to define a cylinder aperture surface. Some such embodiments implementing a cylinder aperture further comprise a cylindrical support supporting the array of electrically conductive tapered projections arranged to define the cylinder aperture surface, with the at least one printed circuit board comprising a plurality of printed circuit boards disposed inside the cylindrical support. In some embodiments, the plurality of printed circuit boards comprise perpendicular printed circuit boards each having an edge proximate to an inside surface of the cylindrical support and each being perpendicular to the cylindrical support at the edge proximate to the cylindrical support. In some embodiments, the plurality of printed circuit boards comprise circular printed circuit boards disposed concentrically inside the cylindrical support and having circular perimeters that are proximate to the inside surface of the cylindrical support.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

Figure 1:
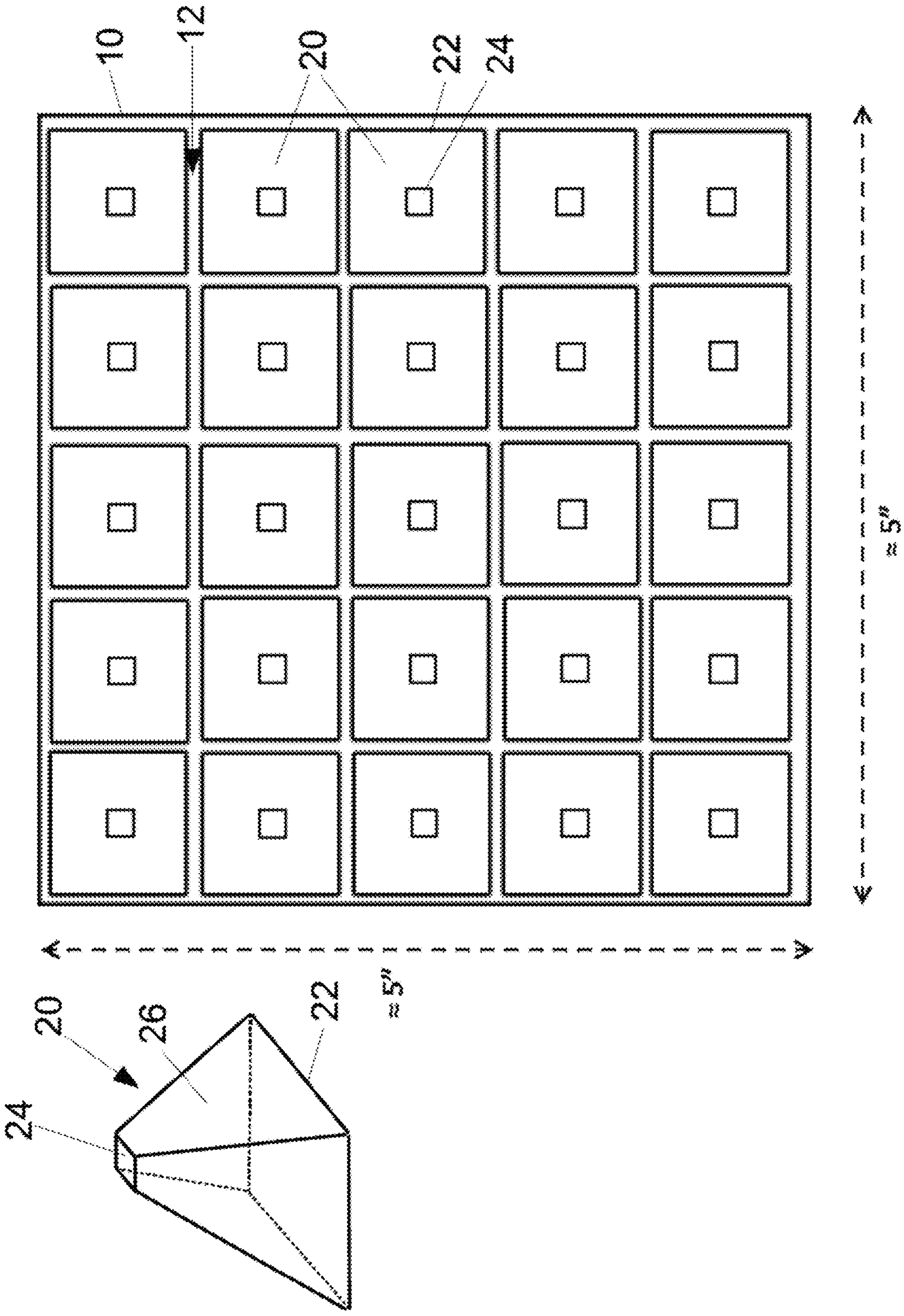
FIGS. 1 and 2 diagrammatically illustrate front and side-sectional views, respectively, of an illustrative differential segmented aperture (DSA).
Figure 2:
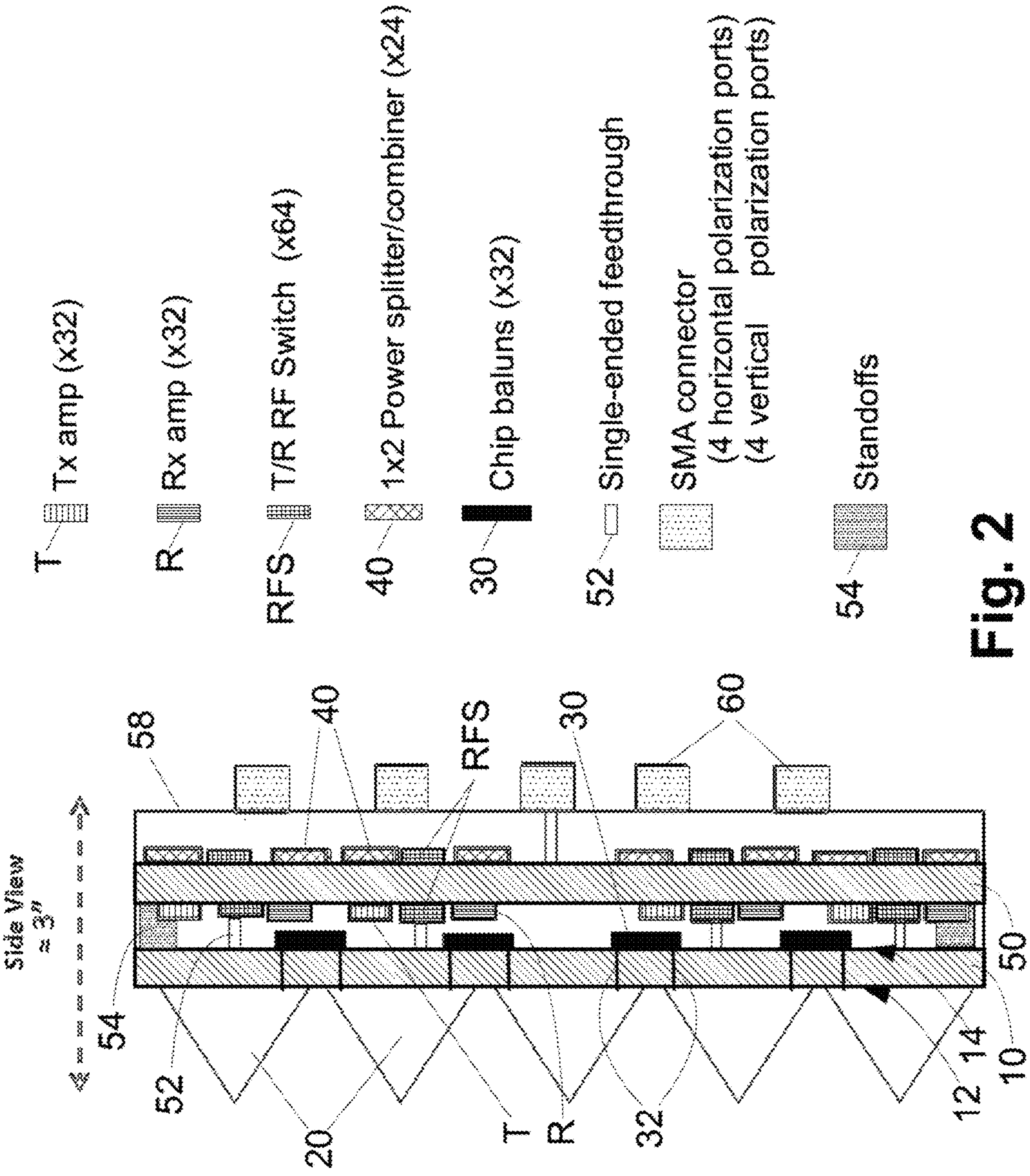

With reference to FIGS. 1 and 2, front and side-sectional views are shown, respectively, of an illustrative radio frequency (RF) aperture, including an interface printed circuit board (i-PCB) 10 having a front side 12 and a back side 14, and an array of electrically conductive tapered projections 20 having bases 22 disposed on the front side 12 of the i-PCB 10 and extending away from the front side 12 of the i-PCB 10. The illustrative i-PCB 10 is indicated in FIG. 1 as having dimensions 5-inch by 5-inch—this is merely a non-limiting illustrative example of a compact RF aperture. FIG. 1 shows the front view of the RF aperture, with an inset in the upper left showing a perspective view of one electrically conductive tapered projection 20. This illustrative embodiment of the electrically conductive tapered projection 20 has a square cross-section with a larger square base 22 and an apex which does not extend to a perfect tip but rather terminates at a flattened apex 24 (in other words, the electrically conductive tapered projection 20 of the inset has a frustoconical shape). This is merely an illustrative example, and more generally the electrically conductive tapered projections 20 can have any type of cross-section (e.g. square as in the inset, or circular, or hexagonal, or octagonal, or so forth). The apex 24 can be flat, as in the example of the inset, or can come to a sharp point, or can be rounded or have some other apex geometry. The rate of tapering as a function of height (i.e. distance "above" the base 22, with the apex 24 being at the maximum "height") can be constant, as in the example of the inset, or the rate of tapering can be variable with height, e.g. the rate of tapering can increase with increasing height so as to form a projection with a rounded peak, or can be decreasing with increasing height so as to form a projection with a more pointed tip. Similarly, as best seen in FIG. 1, the illustrative array of the electrically conductive tapered projections 20 is a rectilinear array with regular rows and orthogonal regular columns; however, the array may have other symmetry, e.g. a hexagonal symmetry, octagonal symmetry, or so forth. In the illustrative example of the inset, the square base 22 and square apex 24 lead to the electrically conductive tapered projection 20 having four flat slanted sidewalls 26; however, other sidewall shapes are contemplated, e.g. if the base and apex are circular (or the base is circular and the apex comes to a point) then the sidewall will be a slanted or tapering cylinder; for a hexagonal base and a hexagonal or pointed apex there will be six slanted sidewalls, and so forth.

Figure 3:
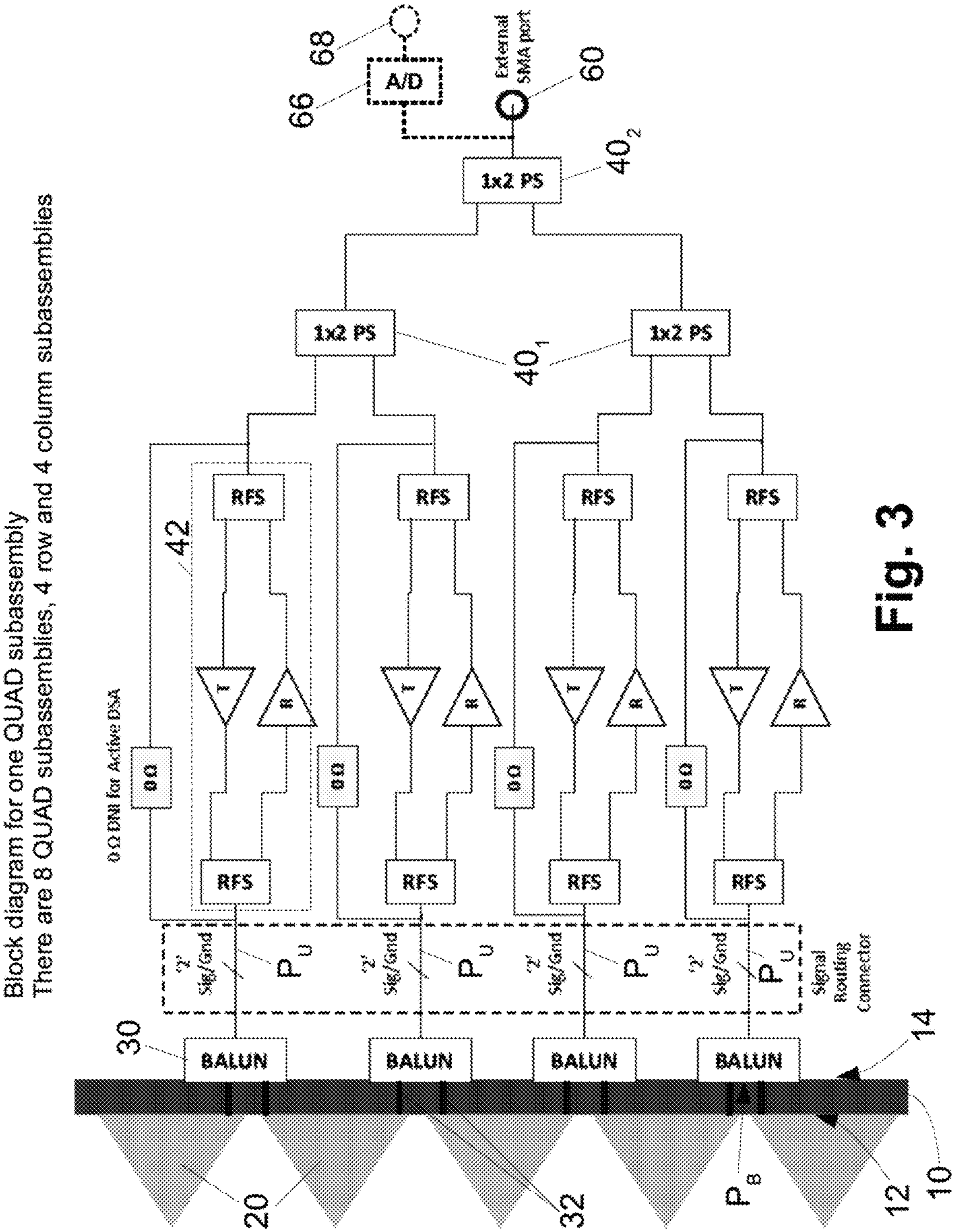
FIG. 3 diagrammatically shows a block diagram of a single QUAD subassembly of the DSA of FIGS. 1-4.

With continuing reference to FIGS. 1 and 2 and with further reference to FIG. 3, the RF aperture further comprises RF circuitry, which in the illustrative embodiment includes chip baluns 30 mounted on the back side 14 of the i-PCB 10. Alternatively, the baluns 30 may be otherwise implemented, e.g., as baluns inscribed into the i-PCB 10. In another approach, the signal chain(s) driving the RF aperture may be entirely differential signal chains, in which case the baluns can be omitted. Each chip balun 30 has a balanced port PB (see FIGS. 3 and 6) electrically connected with two neighboring electrically conductive tapered projections of the array of electrically conductive tapered projections via electrical feedthroughs 32 passing through the i-PCB 10. Each chip balun 30 further has an unbalanced port Pu (see FIGS. 3 and 6) connecting with the remainder of the RF circuitry. The illustrative RF circuitry further includes RF power splitter/combiners 40 for combining the outputs from the unbalanced ports Pu of the chip baluns 30. As seen in FIG. 3, the illustrative electrical configuration of the RF circuitry employs first level 1×2 RF power splitter/combiners $40_1$ that combine pairs of unbalanced ports Pu, and second level 1×2 RF power splitter/combiners $40_2$ that combine outputs of pairs of the first level RF power splitter/combiners $40_1$. This is merely an illustrative approach, and other configurations are contemplated, such as using 1×3 (which combine three lines), 1×4 (combining four lines), or higher-combining RF power splitter/combiners, or various combinations thereof. The illustrative RF circuitry further includes a signal conditioning circuit 42 interposed between each unbalanced port Pu of the chip baluns 30 and the first level 1×2 power splitter $40_1$. The signal conditioning circuit 42 connected with each unbalanced port includes: an RF transmit amplifier T; an RF receive amplifier R; and RF switching circuitry including switches RFS configured to switch between a transmit mode operatively connecting the RF transmit amplifier T with the unbalanced port and a receive mode operatively connecting the RF receive amplifier R with the unbalanced port.

Figure 4:
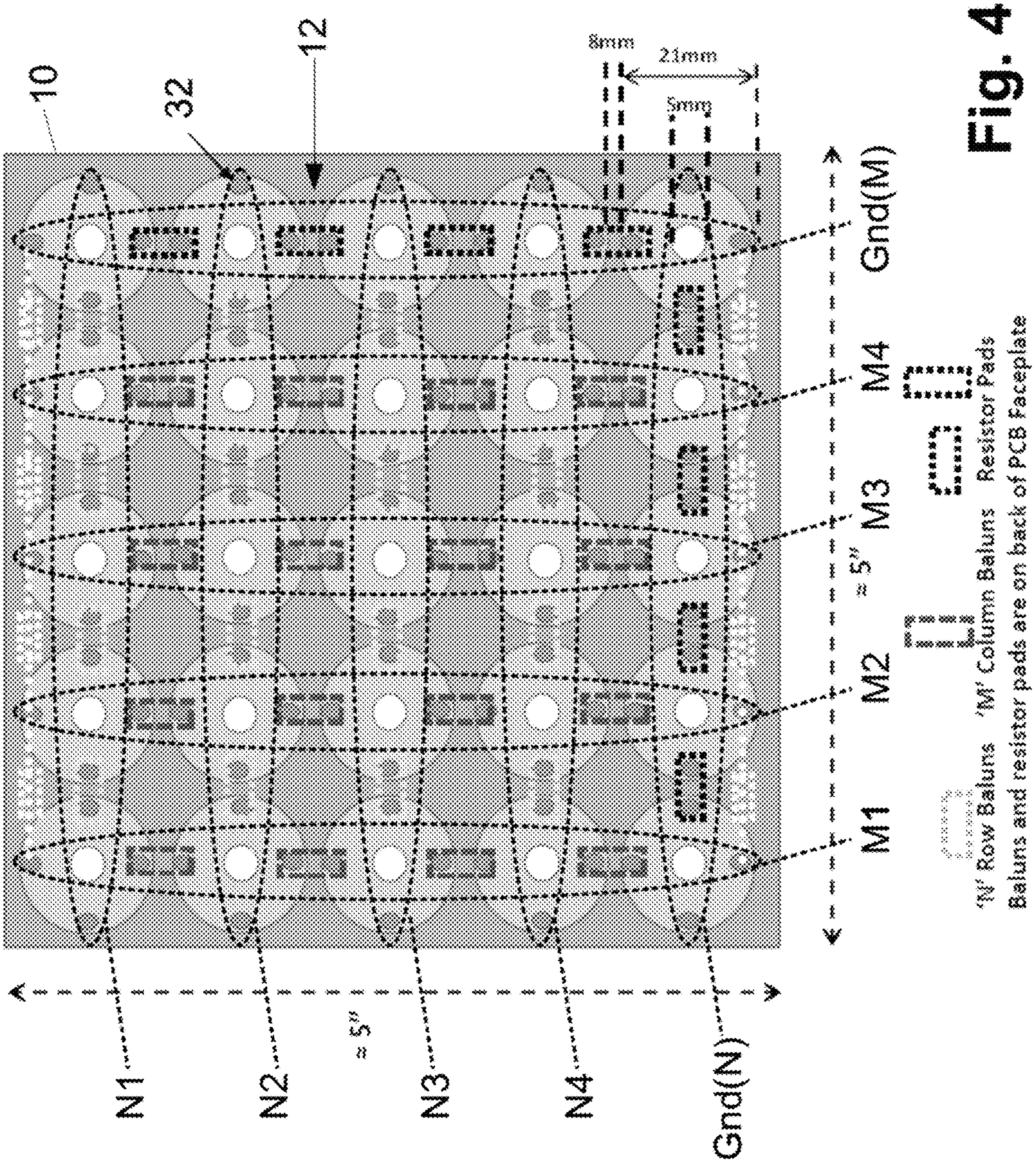
FIG. 4 diagrammatically illustrates a front view of the interface printed circuit board (i-PCB) of the DSA of FIGS. 1-3 including vias and mounting holes and diagrammatically indicated locations of baluns and resistor pads.
Figure 5:
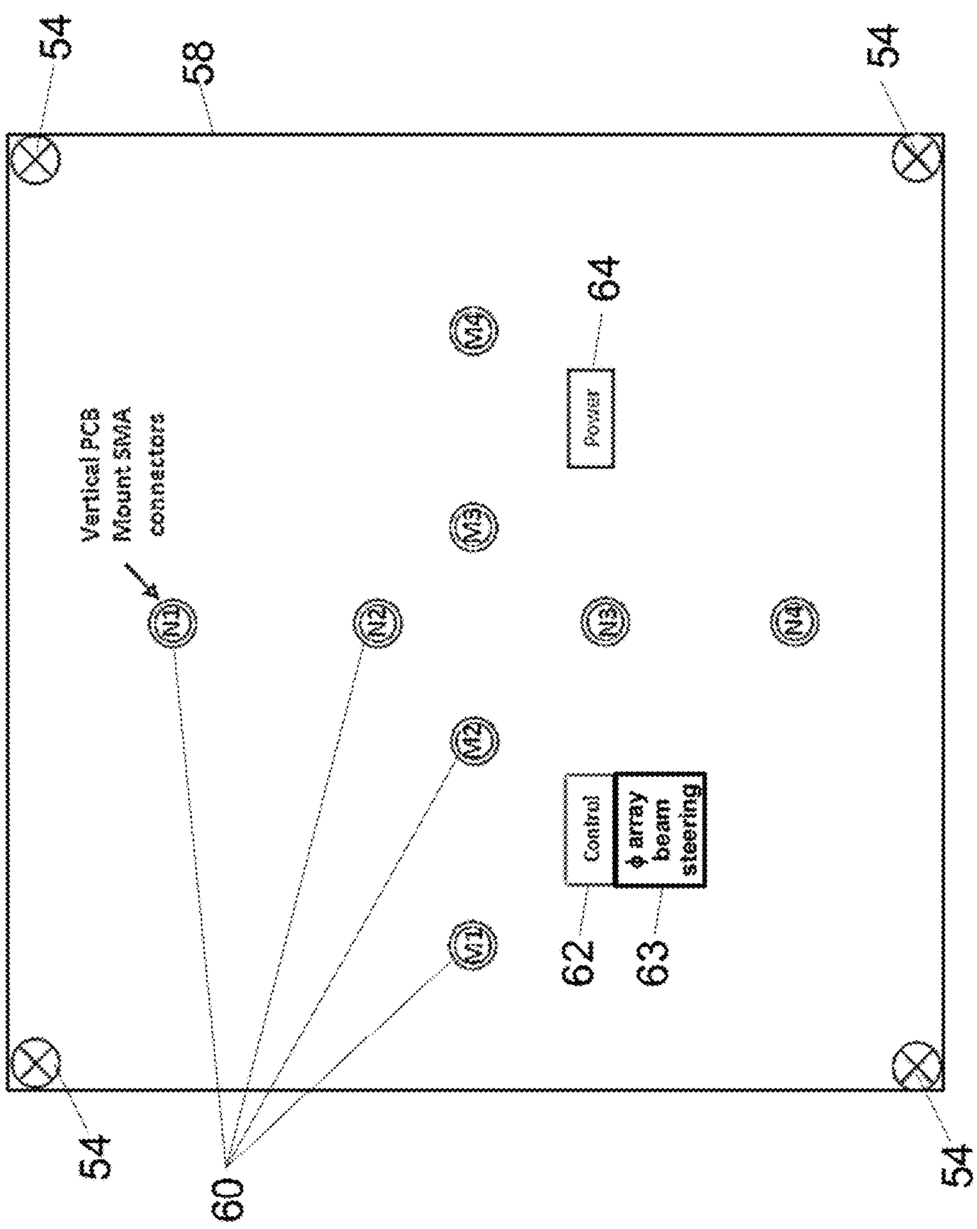
FIG. 5 diagrammatically illustrates a rear view of the enclosure of the DSA of FIGS. 1-4 including diagrammatically indicated RF connections, control, and power connectors.

With continuing reference to FIGS. 1-3 and with further reference to FIGS. 4 and 5, a compact design is achieved (e.g., depth of 3-inches in the non-limiting illustrative example of FIG. 3) in part by employing one or more printed circuit boards (PCBs) including at least the i-PCB 10. In the illustrative example shown in FIG. 3, the chip baluns 30 are mounted on the back side 14 of the i-PCB 10. Optionally, the other electronic components may also be mounted on the back side of the i-PCB 10 on whose front side 12 the array of electrically conductive tapered projections 20 are disposed. However, there may be insufficient real estate on the i-PCB 10 to mount all the electronics of the RF circuitry. In the illustrative embodiment, this is handled by providing a second printed circuit board 50 which is disposed parallel with the i-PCB 10 and faces the back side 14 of the i-PCB 10. Said another way, the second printed circuit board 50 is disposed on the (back) side 14 of the i-PCB 10 opposite from the (front) side 12 of the i-PCB 10 on which the electrically conductive tapered projections 20 are disposed. The RF circuitry comprises electronic components mounted on the second printed circuit board 50, which may also be referred to herein as a signal conditioning PCB or SC-PCB 50, and additionally or alternatively comprises electronic components mounted on the i-PCB 10 (typically on the back side 14 of the i-PCB, although it is also contemplated (not shown) to mount components of the RF circuitry on the front side of the i-PCB in field space between the electrically conductive tapered projections 20. If the SC-PCB 50 is provided, as shown in FIG. 2 it is suitably secured in parallel with the i-PCB 10 by standoffs 54, and single-ended feed-throughs 52 are provided to electrically interconnect the i-PCB 10 and the SC-PCB 50 (see FIG. 3). If the RF circuitry is unable to fit onto the real estate of two PCBs 10, 50, a third (and fourth, and more, as needed) PCB may be added (not shown) to accommodate the components of the RF circuitry.

FIG. 4 shows a front view of the i-PCB 10 including vias and mounting holes and diagrammatically indicated locations of baluns 30 and resistor pads as indicated in the legend shown in FIG. 4. (The resistors are used to terminate the unused side of the pyramids to help lower radar cross section).

With reference to FIG. 2 and with further reference to FIG. 5, the illustrative RF aperture has an enclosure 58 which in the illustrative example is secured at its periphery with the periphery of the i-PCB 10 so as to enclose the RF circuitry. This is merely one illustrative arrangement, and other designs are contemplated, e.g. both PCBs 10, 50 may be disposed inside an enclosure (although such an enclosure should not comprise RF shielding extending forward so as to occlude the area of the RF aperture). FIG. 5 diagrammatically illustrates a rear view of the enclosure 58 of the RF aperture, showing diagrammatically indicated RF connectors (or ports) 60 (also shown or indicated in FIGS. 2 and 3), control electronics 62 (for example, illustrative phased array beam steering electronics 63 shown by way of non-limiting illustration; these electronics 62, 63 may be mounted on the exterior of the enclosure 58 and/or may be disposed inside the enclosure 58 providing beneficial RF shielding), and a power connector 64 for providing power for operating the active components of the RF circuitry (e.g. operating power for the active RF transmit amplifiers T and the active RF receive amplifiers R, and the switches RFS). The particular arrangement of the various components 60, 62, 63, 64 over the area of the back side of the enclosure can vary widely from that shown in FIG. 5, and moreover, these components may be located elsewhere, e.g. the RF connectors 60 could alternatively be located at an edge of the RF aperture or so forth. It will also be appreciated that the RF aperture could be constructed integrally with some other component or system—for example, if the RF aperture is used as the RF transmit and/or receive element of a mobile ground station, a maritime radio, an unmanned aerial vehicle (UAV), or so forth, in which case the enclosure 58 might be replaced by having the RF aperture built into a housing of the mobile ground station, maritime radio, UAV fuselage, or so forth. In such cases, the RF connectors 60 might also be replaced by hard-wired connections to the mobile ground station, maritime radio, UAV electronics, or so forth.

With particular reference to FIG. 3, an illustrative electrical configuration for the illustrative RF circuitry is shown. In this non-limiting illustrative example, the array of electrically conductive tapered projections 20 is assumed to be a 5×5 array of electrically conductive tapered projections 20, as shown in FIGS. 1 and 4. The balanced ports PB of the chip baluns 30 connect adjacent (i.e. neighboring) pairs of electrically conductive tapered projections 20 of the array so as to receive the differential RF signal between the two adjacent electrically conductive tapered projections 20 (in receive mode; or, alternatively, to apply a differential RF signal between the two adjacent electrically conductive tapered projections 20 in transmit mode). As detailed in Steinbrecher, U.S. Pat. No. 7,420,522 which is incorporated herein by reference in its entirety, the tapering of the electrically conductive tapered projections 20 presents a separation between the two electrically conductive tapered projections 20 that varies with the "height", i.e. with distance "above" the base 22 of the electrically conductive tapered projections 20. This provides broadband RF capture since a range of RF wavelengths can be captured corresponding to the range of separations between the adjacent electrically conductive tapered projections 20 introduced by the tapering. The RF aperture is thus a differential segmented aperture (DSA), and has differential RF receive (or RF transmit) elements corresponding to the adjacent pairs of electrically conductive tapered projections 20. These differential RF receive (or transmit) elements are referred to herein as aperture pixels. For the illustrative rectilinear 5×5 array of adjacent electrically conductive tapered projections 20, this means there are 4 aperture pixels along each row (or column) of 5 electrically conductive tapered projections 20. More generally, for a rectilinear array of projections having a row (or column) of N electrically conductive tapered projections 20, there will be a corresponding N−1 pixels along the row (or column). FIG. 3 shows a QUAD subassembly, which is an interconnection of a row (or column) of four pixels. As there are four rows, and four columns, this leads to 4×4 or 16 such QUAD subassemblies. The resistor pads are used as terminations for the unused edges of the perimeter pyramids to prevent unnecessary reflections. Without the resistors mounted via the resistor pads, those surfaces would be left floating and could re-radiate incident RF energy, causing an enhanced radar cross section.

In the illustrative embodiment shown in FIG. 3, the second level 1×2 RF power splitter/combiner $\mathbf{40}_2$ of each QUAD subassembly connects with an RF connector 60 at the backside of the enclosure 58. Hence, as seen in FIG. 5, there are eight RF connectors for the eight QUAD subassemblies, denoted in FIGS. 4 and 5 as the row QUAD subassemblies N1, N2, N3, N4 and the column QUAD subassemblies M1, M2, M3, M4. The Gnd(N) row and the Gnd(M) column are circuit grounds to allow a common path for current flow from the captured RF energy along the perimeter sides of the pyramids. The use of the QUAD subassemblies permits a high level of flexibility in RF coupling to the RF aperture. For example, the illustrative phased array beam steering electronics 63 may be implemented by introducing appropriate phase shifts $\phi_N$, N=1, . . . , 4 for the row QUAD subassemblies N1, N2, N3, N4 and phase shifts $\phi_M$, M=1, . . . , 4 for the column QUAD subassemblies M1, M2, M3, M4 to steer the transmitted RF signal beam in a desired direction, or to orient the RF aperture to receive an RF signal beam from a desired direction (transmit or receive being controlled by the settings of the switches RFS of the signal conditioning circuits 42). Other applications that may be implemented by the RF aperture include: simultaneous "Transmit/Receive, dual circular polarization modes", and "Scalability" by physically locating multiple DSAs in close physical proximity giving the combined effect of increased aperture size. In an alternative embodiment diagrammatically shown in FIG. 3, the RF connectors 60 may be replaced by analog-to-digital (ND) converters 66 and digital connectors 68 via which digitized signals are output. More generally, the ND conversion may be inserted anywhere in the RF chain, for example ND converters could be placed at the outputs of the signal conditioning circuits 42 and the analog first and second level RF power splitter/combiners $\mathbf{40}_1$, $\mathbf{40}_2$ then replaced by digital signal processing (DSP) circuitry.

The described electronics employing PCBs 10, 50, chip baluns 30, and active signal conditioning components (e.g. active transmit amplifiers T and receive amplifiers R) advantageously enables the RF aperture to be made compact and lightweight. As described next, embodiments of the electrically conductive tapered projections 20 further facilitate providing a compact and lightweight broadband RF aperture.

Figure 6:
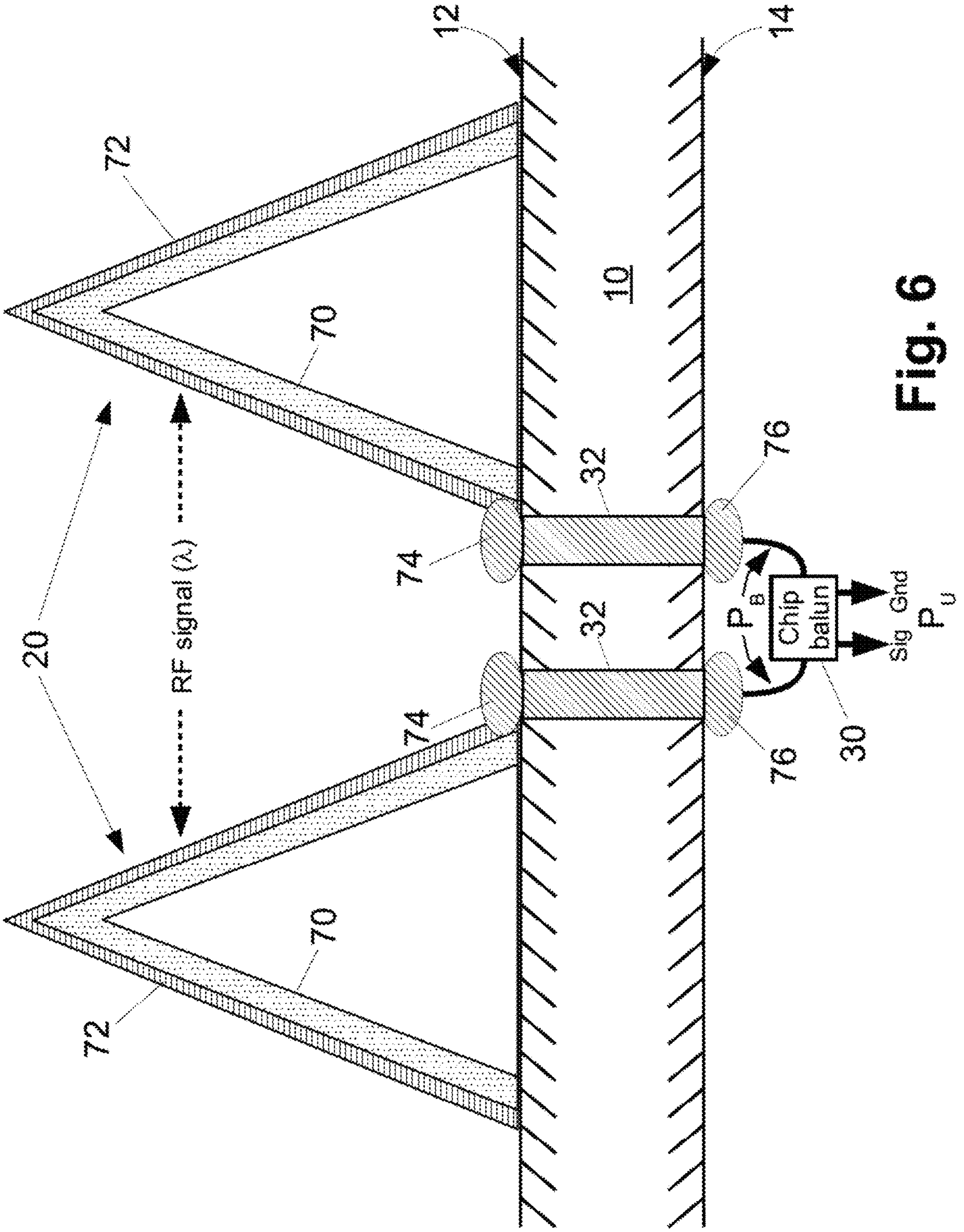
FIG. 6 diagrammatically illustrates a side sectional view of an embodiment of the electrically conductive tapered projections, along with a diagrammatic representation of the connection of the balanced port of a chip balun between two adjacent electrically conductive tapered projections.

FIG. 6 shows a side sectional view of one illustrative embodiment in which each electrically conductive tapered projection 20 is fabricated as a dielectric tapered projection 70 with an electrically conductive layer 72 disposed on a surface of the dielectric tapered projection 70. The dielectric tapered projections may, for example, be made of an electrically insulating plastic or ceramic material, such as acrylonitrile butadiene styrene (ABS), polycarbonate, or so forth, and may be manufactured by injection molding, three-dimensional (3D) printing, or other suitable techniques. The electrically conductive layer 72 may be any suitable electrically conductive material such as copper, a copper alloy, silver, a silver alloy, gold, a gold alloy, aluminum, an aluminum alloy, or so forth, or may include a layered stack of different electrically conductive materials, and may be coated onto the dielectric tapered projection 70 by vacuum evaporation, RF sputtering, or any other vacuum deposition technique. FIG. 6 shows an example in which solder points 74 are used to electrically connect the electrically conductive layer 72 of each dielectric tapered projection 20 with its corresponding electrical feedthrough 32 passing through the i-PCB 10. FIG. 6 also shows the illustrative connection of the balanced port PB of one chip balun 30 between two adjacent electrically conductive tapered projections 20 via solder points 76.

Figure 7:
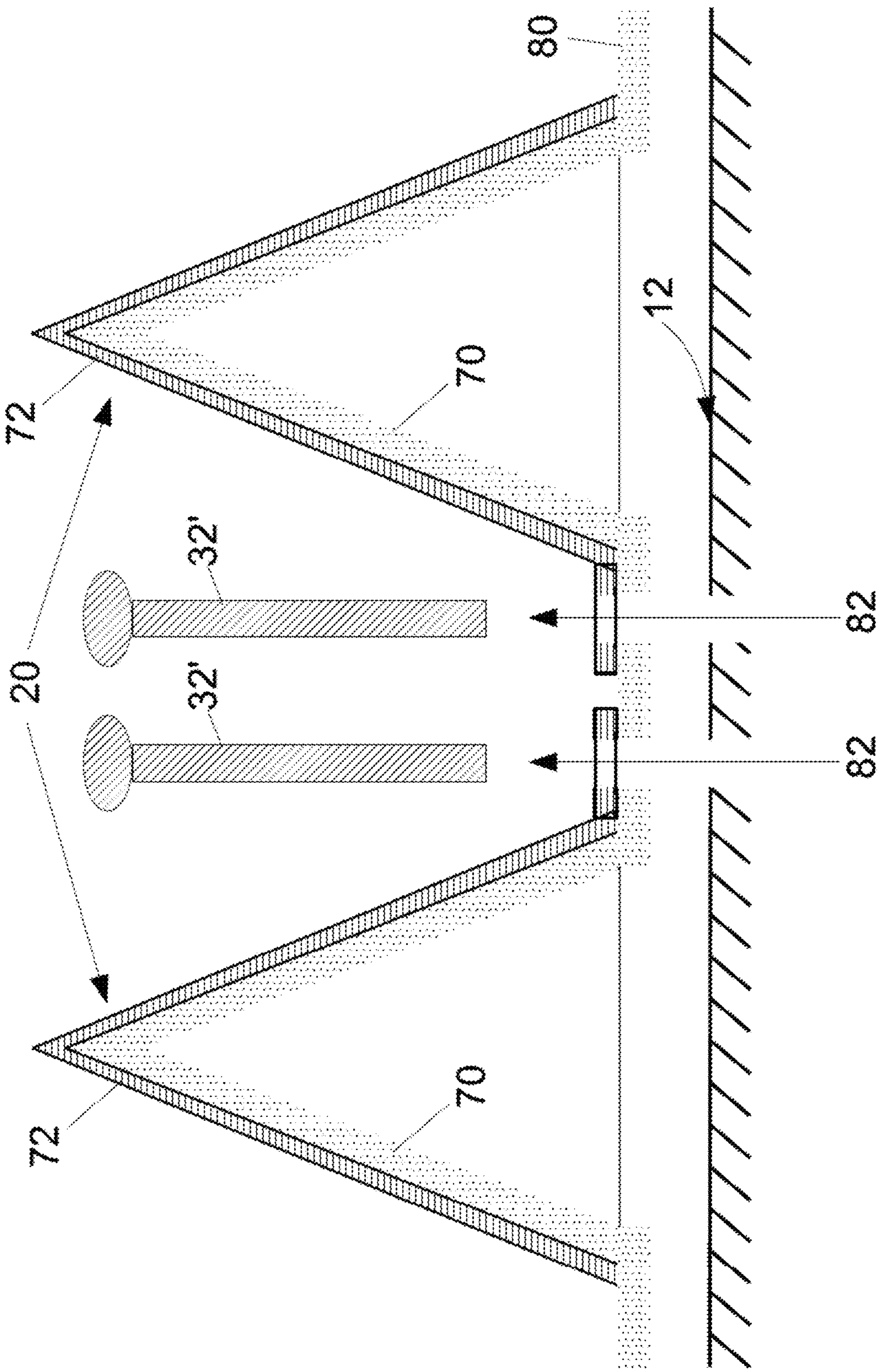
FIGS. 7-10 diagrammatically illustrate additional embodiments of the electrically conductive tapered projections.
Figure 8:
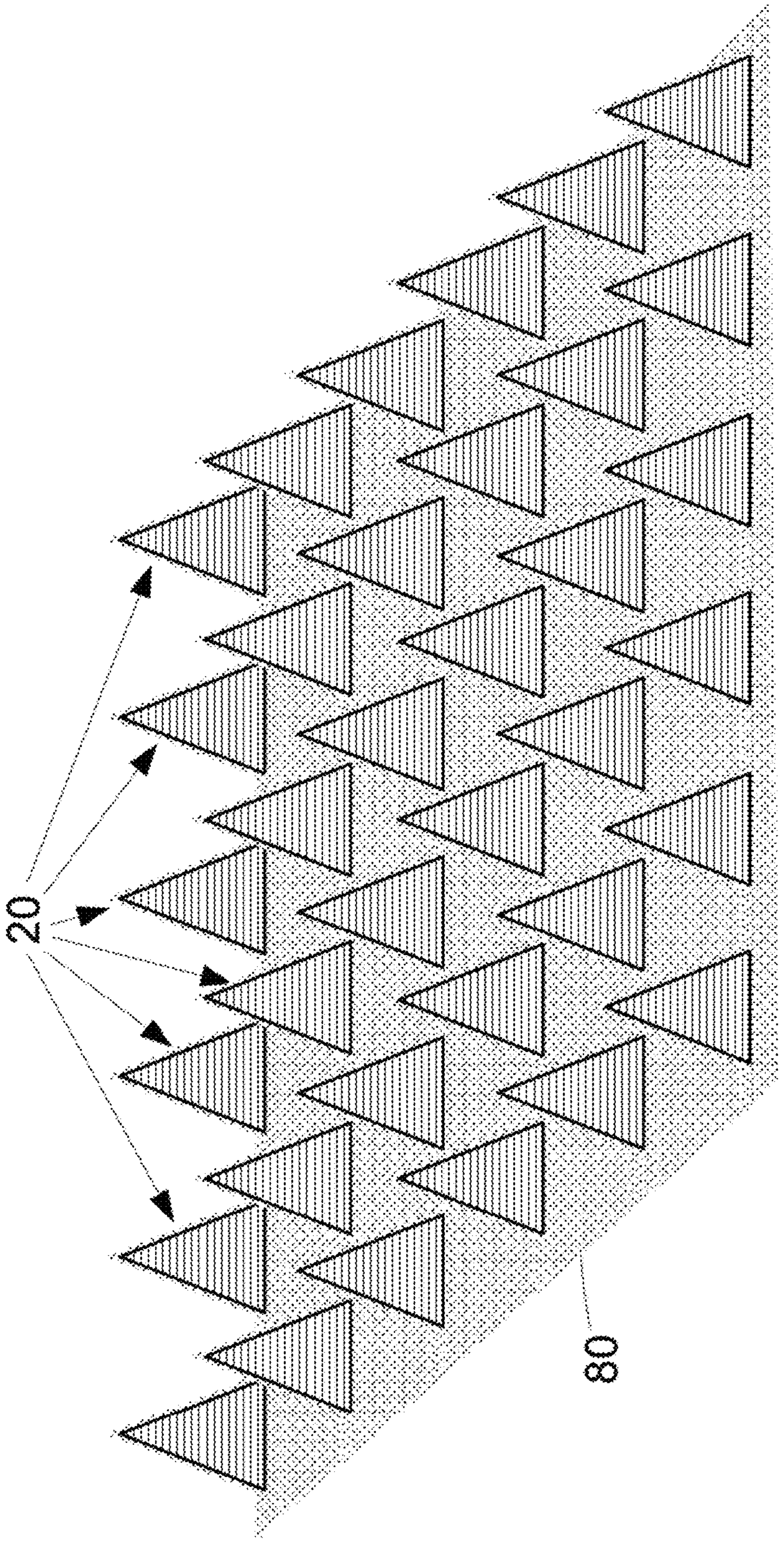

FIGS. 7 and 8 show an exploded side-sectional view and a perspective view, respectively, of an embodiment in which the dielectric tapered projections 70 are integrally included in a dielectric plate 80. The electrically conductive layer 72 coats each dielectric tapered projection 70 but has isolation gaps 82 that provide galvanic isolation between the neighboring dielectric tapered projections 20. The isolation gaps 82 can be formed after coating the electrically conductive layer 72 by, after the coating, etching the coating away from the plate 80 between the electrically conductive tapered projections 20 to galvanically isolate the electrically conductive tapered projections from one another. Alternatively, the isolation gaps 82 can be defined before the coating by, before the coating, depositing a mask material (not shown) on the plate 80 between the electrically conductive tapered projections 20 so that the coating does not coat the plate in the isolation gaps 82 between the electrically conductive tapered projections whereby the electrically conductive tapered projections are galvanically isolated from one another. As seen in the perspective view of FIG. 8, the result is that the dielectric plate 80 covers (and therefore occludes) the surface of the i-PCB 10, with the electrically conductive tapered projections 20 extending away from the dielectric plate 80.

With particular reference to FIG. 7, in one approach for the electrical interconnection, through-holes 82 pass through the illustrative plate 80 and the underlying i-PCB 10, and rivets, screws, or other electrically conductive fasteners 32' pass through the through-holes 82 (note that FIG. 7 is an exploded view) and when thusly installed form the electrical feedthroughs 32' passing through the i-PCB 10. (Note, the perspective view of FIG. 8 is simplified, and does not depict the fasteners 32'). The use of the dielectric plate 80 with integral dielectric tapered projections 70 and the combined fastener/feedthroughs 32' advantageously allows the electrically conductive tapered projections 20 to be installed with precise positioning and without soldering.

In the embodiments of FIGS. 6-8, the electrically conductive coating 72 is disposed on the outer surfaces of the dielectric tapered projections 70. In this case, the dielectric tapered projections 70 may be either hollow or solid.

Figure 9:
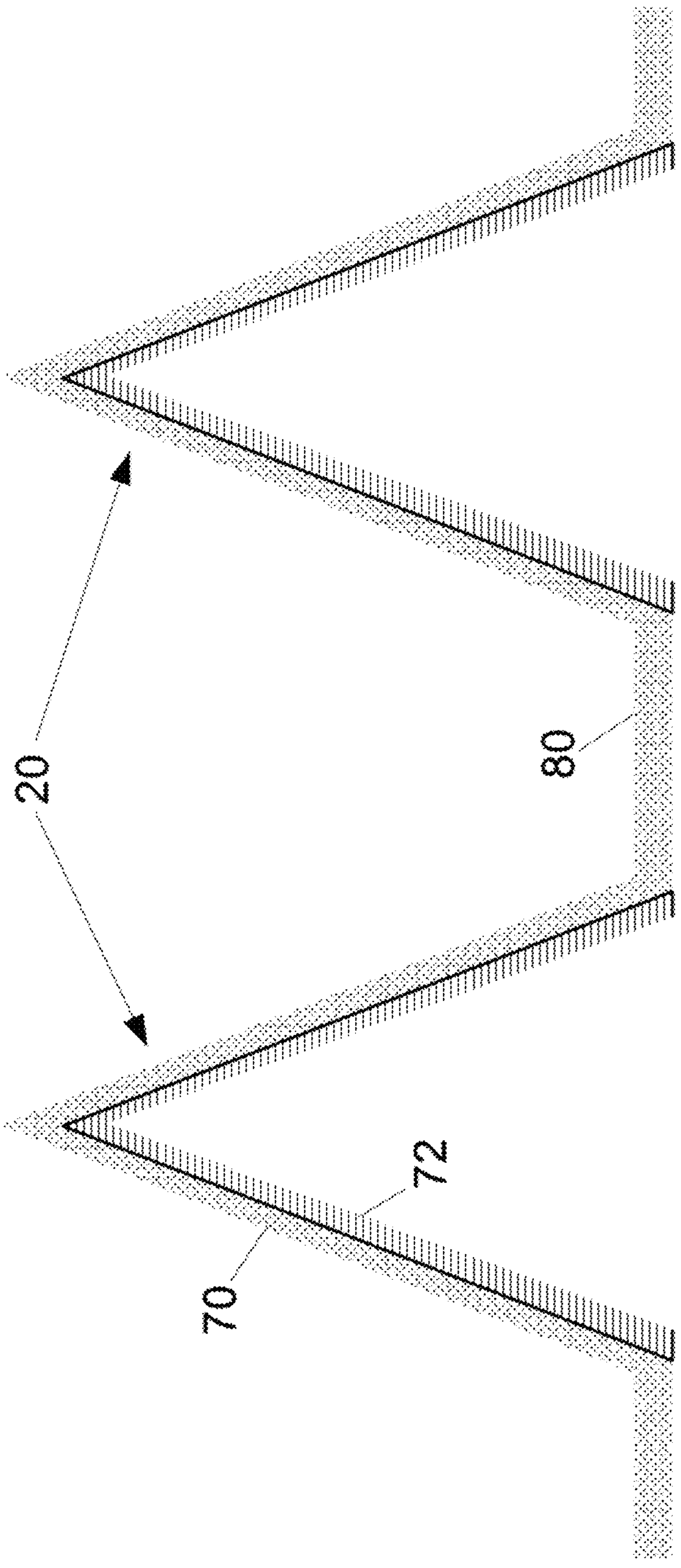
Figure 10:
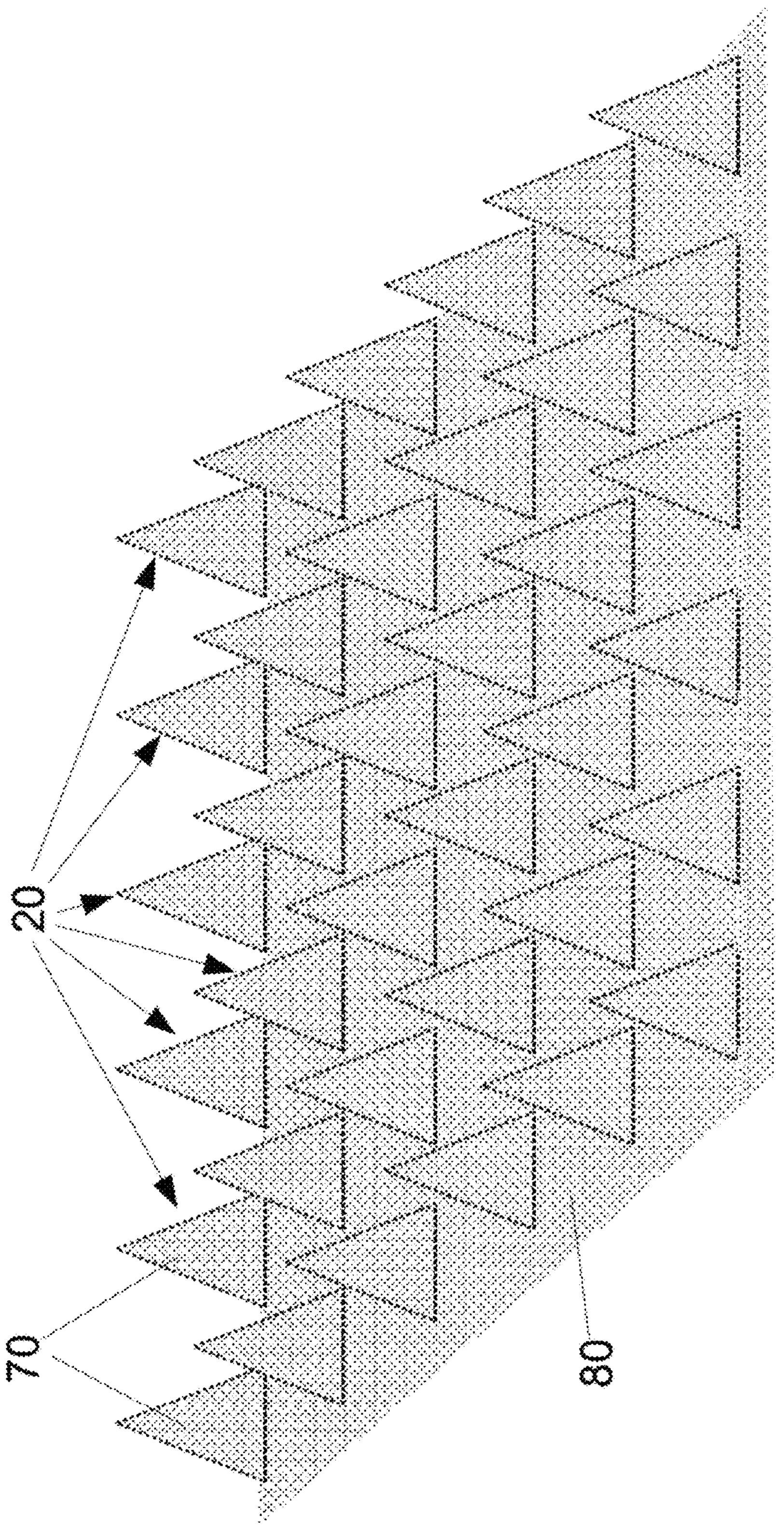

With reference to FIGS. 9 and 10, as the dielectric material is substantially transparent to the RF radiation, the electrically conductive coating 72 may instead be coated on inner surfaces of the (hollow) dielectric tapered projections 70. FIG. 9 shows a side sectional view of such an embodiment, while FIG. 10 shows a perspective view. The embodiment of FIGS. 9 and 10 again employs a dielectric plate 80 including the dielectric tapered projections 70. As seen in FIG. 10, by coating the electrically conductive coatings 72 on the inner surfaces of the hollow dielectric tapered projections 70, this results in the electrically conductive coating 72 being protected from contact from the outside by the dielectric plate 80 including the integral dielectric tapered projections 70. This can be useful in environments in which weathering may be a problem.

It is to be appreciated that the various disclosed aspects are illustrative examples, and that the disclosed features may be variously combined or omitted in specific embodiments. For example, one of the illustrative examples of the electrically conductive tapered projections 20 or a variant thereof may be employed without the QUAD subassembly circuitry configuration of FIGS. 2-5. Conversely the QUAD subassembly circuitry configuration of FIGS. 2-5 or a variant thereof may be employed without the dielectric/coating configuration for the electrically conductive tapered projections 20. Likewise, the chip baluns 30 may or may not be used in a specific embodiment; and/or so forth.

The RF aperture designs of FIGS. 1-10 employ the illustrative planar i-PCB 10. This design is generally limited to about a 180° (solid) angular field of view (FOV) or less. To obtain a larger (solid) angular FOV, two or more such planar RF apertures may be arranged at different directions, e.g. three planar DSAs oriented at 120° azimuth angle intervals can provide angular coverage potentially up to 360°. Likewise, four planar DSAs at 90° azimuth angles (e.g. forming a square) can similarly cover 360°. Such approaches may have difficulty at high elevation, however. Additionally, these arrangements can be bulky, and it is anticipated that coverage quality may exhibit non-uniform behavior at the overlaps between the FOV of angularly neighboring planar DSAs.

Figures 11, 12:
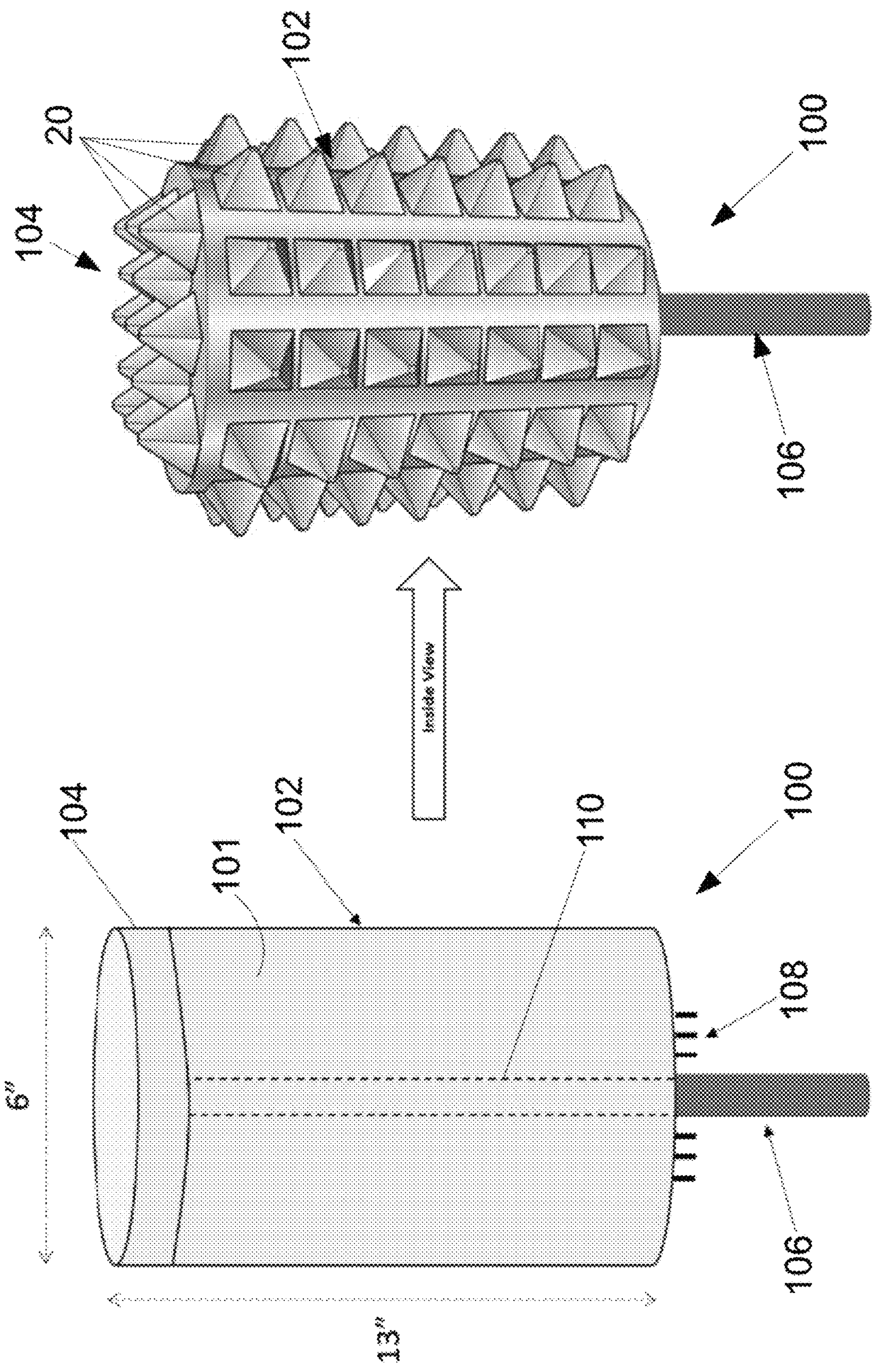
FIG. 11 shows a perspective view of an omni-directional DSA according to a further embodiment.
FIG. 12 shows a perspective view of the omni-directional DSA of FIG. 11 with the outer housing omitted to reveal the cylindrical array of electrically conductive tapered projections (CADSA) for low elevation coupling and the top array of array of electrically conductive tapered projections (TADSA) for high elevation coupling.

With reference to FIGS. 11-17, a compact omni-directional DSA 100 is described. The illustrative omni-directional DSA 100 has non-limiting illustrative dimensions indicated—these are merely examples, and the omni-directional DSA 100 can more generally have any aspect ratio and size. FIG. 11 shows a perspective view of the omni-directional DSA 100 housed in a cosmetic and/or protective housing or enclosure 101. The DSA 100 includes a cylindrical array of electrically conductive tapered projections (CADSA) 102 for low elevation coupling, and a top array of electrically conductive tapered projections (TADSA) 104 for high elevation coupling. FIG. 11 also illustrates a mounting support (e.g. pole) 106 and external ports 108 to enable polarization-independent operation and/or multiple input/multiple output (MIMO) RF transmit and/or receive operation. FIG. 12 shows a perspective view of the DSA 100 of FIG. 11 with the housing or enclosure 101 omitted, so as to reveal the cylindrical RF coupling surface of the CADSA 102 and the planar RF coupling surface of the TADSA 104. These surfaces include arrays of electrically conductive tapered projections 20 embodiments of which have already been described herein.

Figure 13:
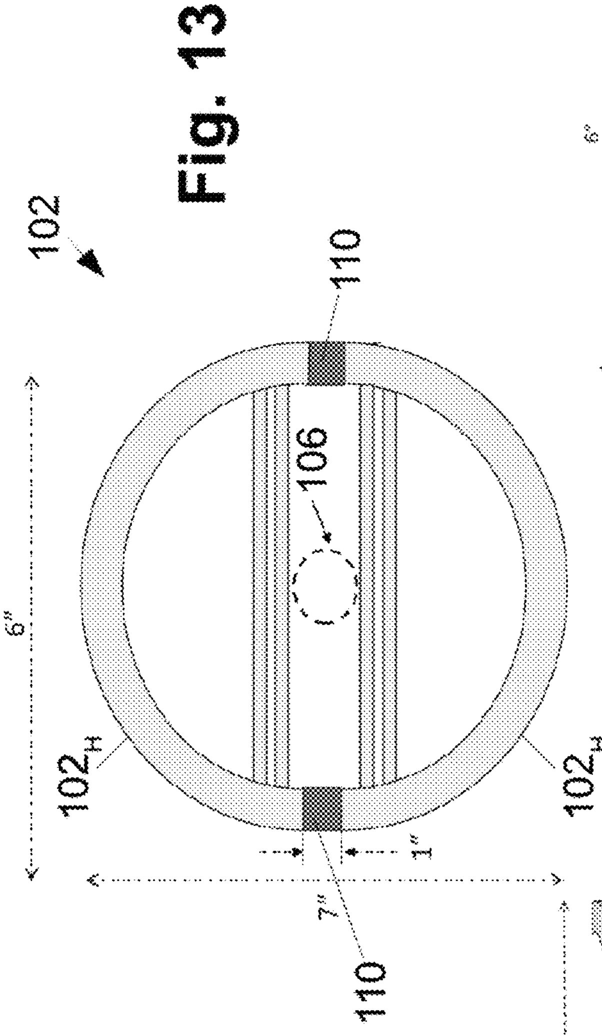
FIG. 13 diagrammatically shows a top view of the CADSA (with the TADSA omitted).
Figure 15:
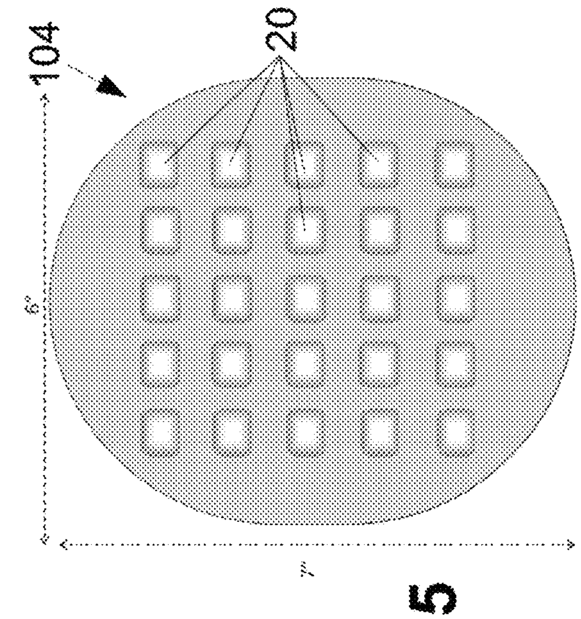
FIG. 15 shows a top view of the TADSA.
Figure 14:
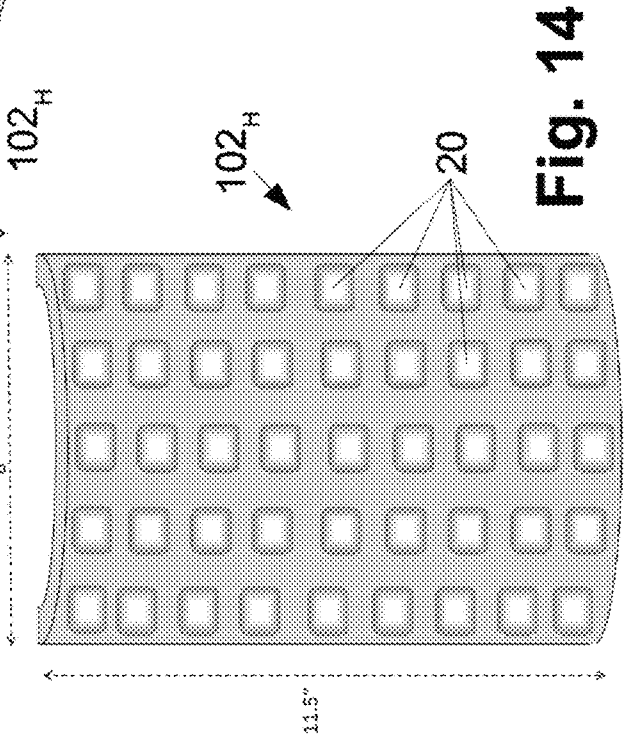
FIG. 14 shows a side view of one semi-cylinder segment of the CADSA.

FIG. 13 diagrammatically shows a top view of the CADSA 102 (with the TADSA 104 omitted). For ease of manufacturability, the illustrative cylindrical CADSA 102 is constructed as two semi-cylinder segments $\mathbf{102}_H$ (that is, the cylinder of the CADSA 102 is divided lengthwise) which are bonded together by lengthwise bonds 110 (also indicated by dashed lines in FIG. 11). The illustrative bonds 110 include spacer elements, but it is contemplated for the bonds to be adhesive bonds, clips or other fasteners, or so forth. FIG. 14 shows a side view of one semi-cylinder segment $\mathbf{102}_H$ of the CADSA 102. FIG. 15 shows a top view of the TADSA 104. The omni-directional DSA 100 is made of three sections: the two semi-cylinder segments $\mathbf{102}_H$ that can be connected as shown to form the CADSA 102 providing a complete (360°) azimuthally omni-directional RF aperture, and the top circular TADSA 104 for high elevation (i.e. high altitude) RF aperture coverage extending up to the zenith. The illustrative TADSA 104 is a planar DSA, with the cylinder axis of the CADSA 102 being perpendicular to the plane of the TADSA 104 (i.e., the cylinder axis of the CADSA 102 is parallel with the surface normal of the plane of the TADSA 104). Although perpendicularity provides advantageous design symmetry, some deviation from perpendicularity is contemplated.

In one variant embodiment, the TADSA 104 is omitted, and the resulting DSA including only the two semi-cylinder segments $\mathbf{102}_H$ connected to form the CADSA 102. If mounted vertically (that is, with the cylinder axis of the CADSA 102 oriented vertically), this DSA provides a complete (360°) azimuthally omni-directional RF aperture, but with reduced or eliminated sensitivity at higher elevations (e.g. at the zenith) due to omission of the TADSA 104. Such a design omitting the TADSA 104 may be appropriate if the application is not expected to involve receiving and/or sending RF signals from and/or to high elevation sources and/or targets.

In a further variant (not shown), the planar TADSA 104 may be replaced by an equivalent component with a curved, e.g. hemispherical, surface bearing the top array of electrically conductive tapered projections 20. However, the illustrative planar TADSA 104 is advantageously convenient for manufacturing and provide acceptable high elevation RF aperture for most applications. It is also noted that while the illustrative top array of electrically conductive tapered projections 20 has a rectilinear array with a square perimeter (see FIG. 15), other array configurations may be employed.

Figure 16:
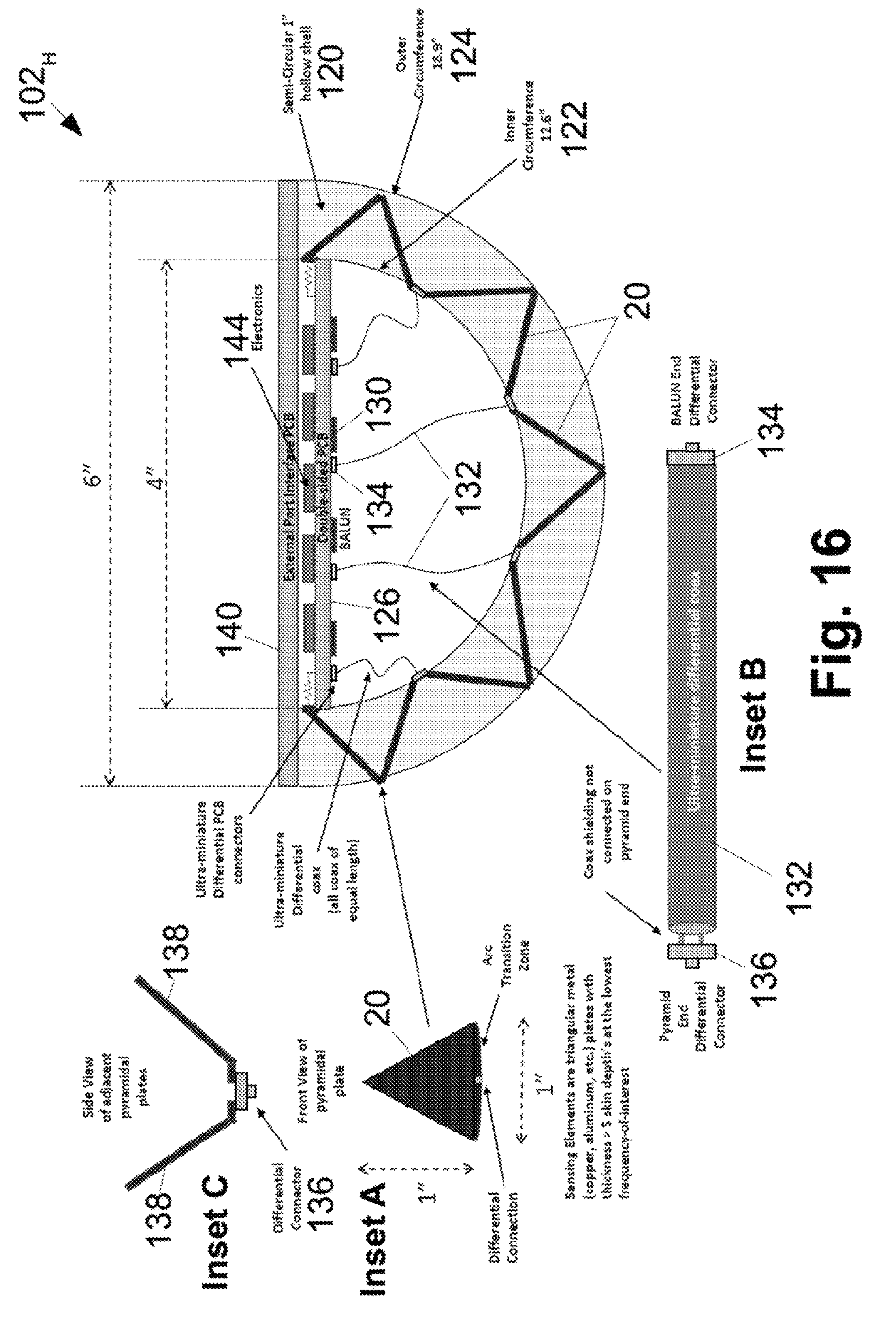
FIG. 16 shows more detailed diagrammatic top view of one semi-cylinder segment of the CADSA (with the TADSA omitted), with detail insets.

FIG. 16 shows more detailed diagrammatic top view of one semi-cylinder segment $\mathbf{102}_H$ of the CADSA 102 (with the TADSA omitted). Inset A shows a perspective view of one of the electrically conductive tapered projections 20 (which in this example is conical tapering to a tip, but more generally could assume any of the other electrically conductive tapered projection designs disclosed herein). As shown in the main drawing of FIG. 16, in the illustrative embodiment the electrically conductive tapered projections 20 are mounted in a semi-circular hollow shell 120, with the bases of the projections 20 secured to an inner circumference surface 122 and the apexes of the projections 20 secured to an outer circumference surface 124. However, other mounting configurations are contemplated, e.g. the apexes may be freestanding (i.e. unsupported) in some alternative embodiments, or the electrically conductive tapered projections 20 may be solid elements mounted by their bases using screws or other fasteners engaging threaded openings in the bases, or the electrically conductive tapered projections 20 may employ electrically conductive plates mounted on dielectric formers, or so forth. The illustrative semi-cylinder segment $\mathbf{102}_H$ further includes a planar printed circuit board 126 which roughly corresponds to the i-PCB 10 of the planar designs of FIGS. 1-10 insofar as it supports chip baluns 130. However, unlike the case of the i-PCB 10, the planar printed circuit board 126 does not support the electrically conductive tapered projections 20 (which are instead here supported by the hollow shell 120). Hence, to provide electrical connections between the balanced ports of the chip baluns 130 and the electrically conductive tapered projections 20, coaxial cables 132 run from the terminals of the balanced ports of the chip baluns 130 to the electrically conductive tapered projections 20. Inset B shows a diagrammatic view of one coaxial cable 132, which has a first differential connector 134 that connects with the unbalanced port of the chip balun 130, and an opposite second differential connector 136 that connects two neighboring sides 138 of two neighboring electrically conductive tapered projections 20 (see Inset C). The second differential connector 136 can thus be seen to serve a function similar to the pair of feedthroughs 32 shown in the embodiment of FIG. 6, for example. In the illustrative design, the second differential connector 136 connects between the neighboring sides 138 of two neighboring projections 20, and the coax shielding of the coaxial cable 132 is not connected to either projection (or to the differential connector 136). More generally, other RF shielded electrical cable configurations are also contemplated. The illustrative coaxial cables 132 are all of the same length; however, this is not required, and it is contemplated to alternatively use shorter cables for connections closer to the junction between the semi-cylindrical shell 120 and the printed circuit board 126 (where the distances to be spanned by the cable are shorter).

The illustrative printed circuit board 126 is planar, hence the coaxial cables 132 are provided to span the distances between the chip baluns 130 on the printed circuit board 126 and the projections 20 mounted in the semi-cylindrical shell 120. However, other configurations are contemplated, such as employing a flexible printed circuit board that is positioned inside and conformal with the inner surface 122 of the shell 120, and on which the chip baluns are then mounted in close proximity to the connected projections.

With continuing reference to FIG. 16, the illustrative semi-cylinder segment 102$_H$ further includes a second printed circuit board 140 that provides further real estate for mounting additional electronics. Hence, the second printed circuit board 140 is seen to perform a role analogous to the SC-PCB 50 shown in FIG. 2. As already discussed, if the main PCB 126 has sufficient real estate then the second PCB 140 may optionally be omitted; conversely, if two PCBs is insufficient then it is contemplated to add a third (or more) PCBs (not shown) to provide additional real estate. In the illustrative example of FIG. 16, the semi-cylindrical shell 120 provides the standoffs separating the two PCBs 126, 140, thus serving the role of the standoffs 54 of the embodiment of FIG. 2. Other assembly configurations are also contemplated. The various electronics 144 may, for example, be analogous to those of the embodiment of FIGS. 2 and 3.

Figure 17:
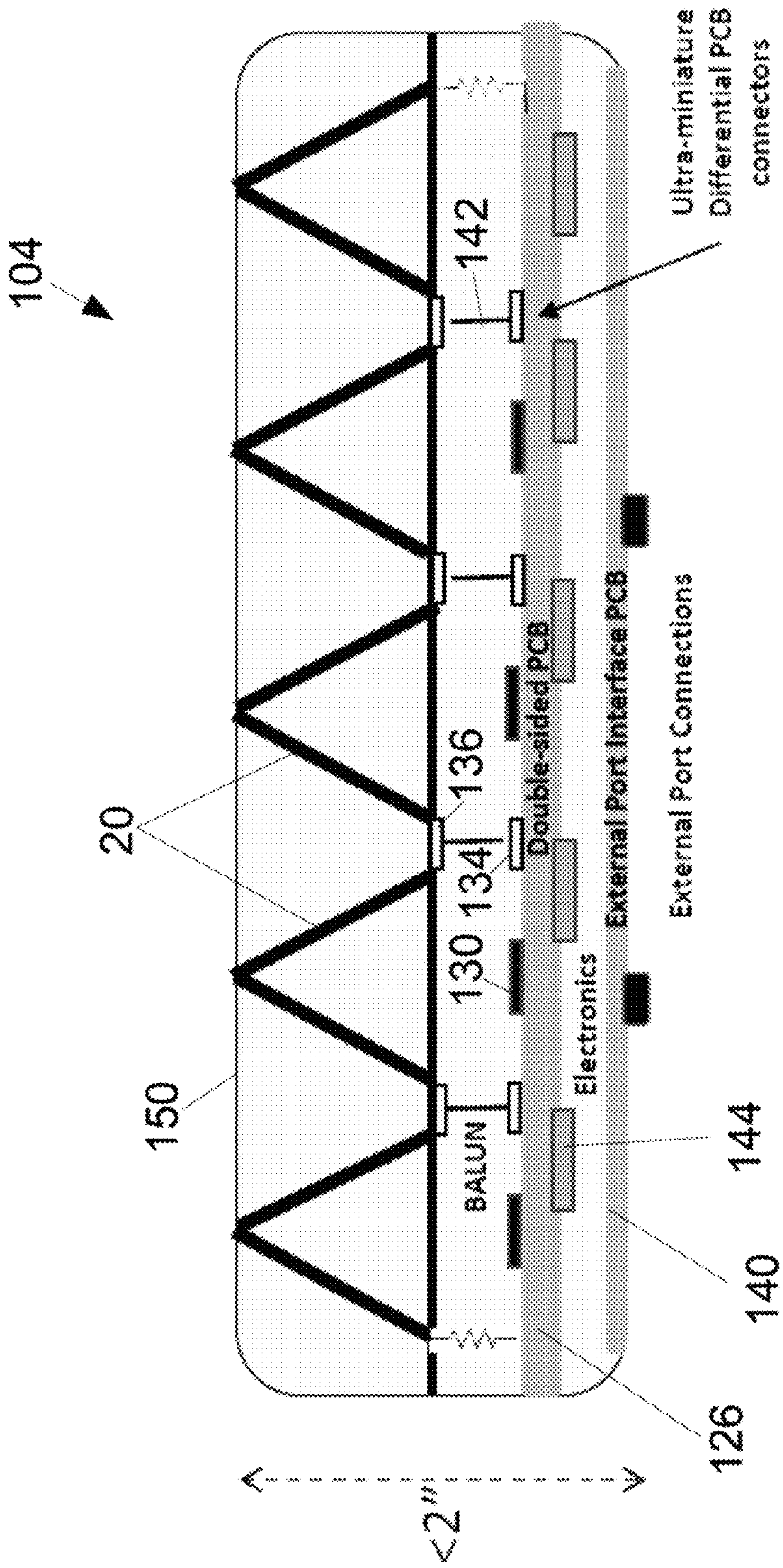
FIG. 17 shows a more detailed diagrammatic side view of the TADSA.

FIG. 17 shows a more detailed diagrammatic side view of the TADSA 104. The electronics are configured similarly to the design of the semi-cylinder segment 102$_H$, and include the two PCBs 126, 140, chip baluns 130 on the first PCB 126 connecting with the projections 20 via the differential connectors 136, and differential connectors 134 connecting with the balanced ports of the baluns 130, and various other electronics 144. Due to the close proximity of the projections 20 of the planar array of electrically conductive tapered projections 20 of the TADSA 104, the coaxial cables 132 of the semi-cylinder segment 102$_H$ can be replaced by feedthroughs 142 (e.g. differential feedthroughs, or paired single-ended feedthroughs). The electronics and the projections 20 are optionally enclosed in a housing or enclosure 150. The use of the illustrative physical design for the TADSA 104 shown in FIG. 17, which is similar to the physical design of the semi-cylinder segment 102$_H$ shown in FIG. 16, advantageously facilitates manufacturability through use of many of the same parts (e.g. the connectors 134, 136, potentially the same circuit boards 126 and/or 140, and/or et cetera). However, it is alternatively contemplated to construct the TADSA 104 using, for example, a physical design similar to that of the embodiment of FIG. 2 (for example, with the planar array of electrically conductive tapered projections 20 of the TADSA being mounted directly to a circuit board that also has the chip baluns mounted on its backside).

In the following, some principles for RF design of the omni-directional DSA 100 of FIGS. 11-17 are described.

A square, flat, aperture plane such as that of the embodiments of FIGS. 1-10 results in a beam pattern that is directional in nature. An estimate of the beam width (in radians) of the square, flat, aperture DSA is given by the following equation:

$$\text{Beamwidth (rad)} = 2\cdot\cos^{-1}\left(1-\frac{\lambda^2}{2\pi A_{eff}}\right) \tag{1}$$

where λ is the wavelength of the RF signal, and $A_{eff}$ is the effective area of the RF aperture. As the effective area ($A_{eff}$) increases, the beamwidth decreases resulting in higher gain on bore sight. At the low-end of the frequency range, the beam width pattern could approach 180 degrees (nearly hemispherical).

RF modeling has shown that a curved (e.g. cylindrical) aperture plane of the CADSA 102 together with the TADSA 104 provides hemispherical (omni-directional in azimuth plus high elevation to zenith coverage) transceiver functionality. Typically, for grazing low angles (terrestrial links) the predominate mode of propagation is the vertically polarized electric field since the horizontal polarized electric field tends to attenuate more quickly, depending on the ground electrical characteristics. That being the case, the vertical dimension may need additional pyramidal sensing elements and be the primary polarization. However, the pyramidal sensing elements could also be connected across the horizontal direction for cross polarization implementation. More generally, the semi-cylindrical segments 102$_H$ of the CADSA 102 provide the option to implement both polarizations with higher sensitivity assigned to vertical polarizations. The top segment (that is, the TADSA 104) is configured in the illustrative example as a square DSA responsive to both orthogonal polarizations and therefore, polarization independent. This segment provides high-elevation and overhead (near-zenith) coverage.

As previously noted, the TADSA 104 may be omitted for applications in which high elevation coverage is of low importance. Likewise, using only one semi-cylindrical segment 102$_H$ (with or without the TADSA) is contemplated with a wide azimuthal angle (but less than 360°) is desired. Moreover, while the illustrative CADSA 102 is cylindrical with a circular cross-section, in other embodiments the curvature of the surface may be different from a circular cross-section. For example, the curved surface of the segments 102$_H$ could be manufactured to be conformal with a curved surface of the fuselage of an aircraft or unmanned aerial vehicle (UAV), or to be conformal with the hull of an ocean-going ship or submarine, or to be conformal with a surface of a round or cylindrical orbiting satellite, or so forth. Moreover, as previously noted, while an omni-directional RF aperture is described, the design could analogously be applied to an acoustic aperture or to a magnetic aperture.

Figure 18:
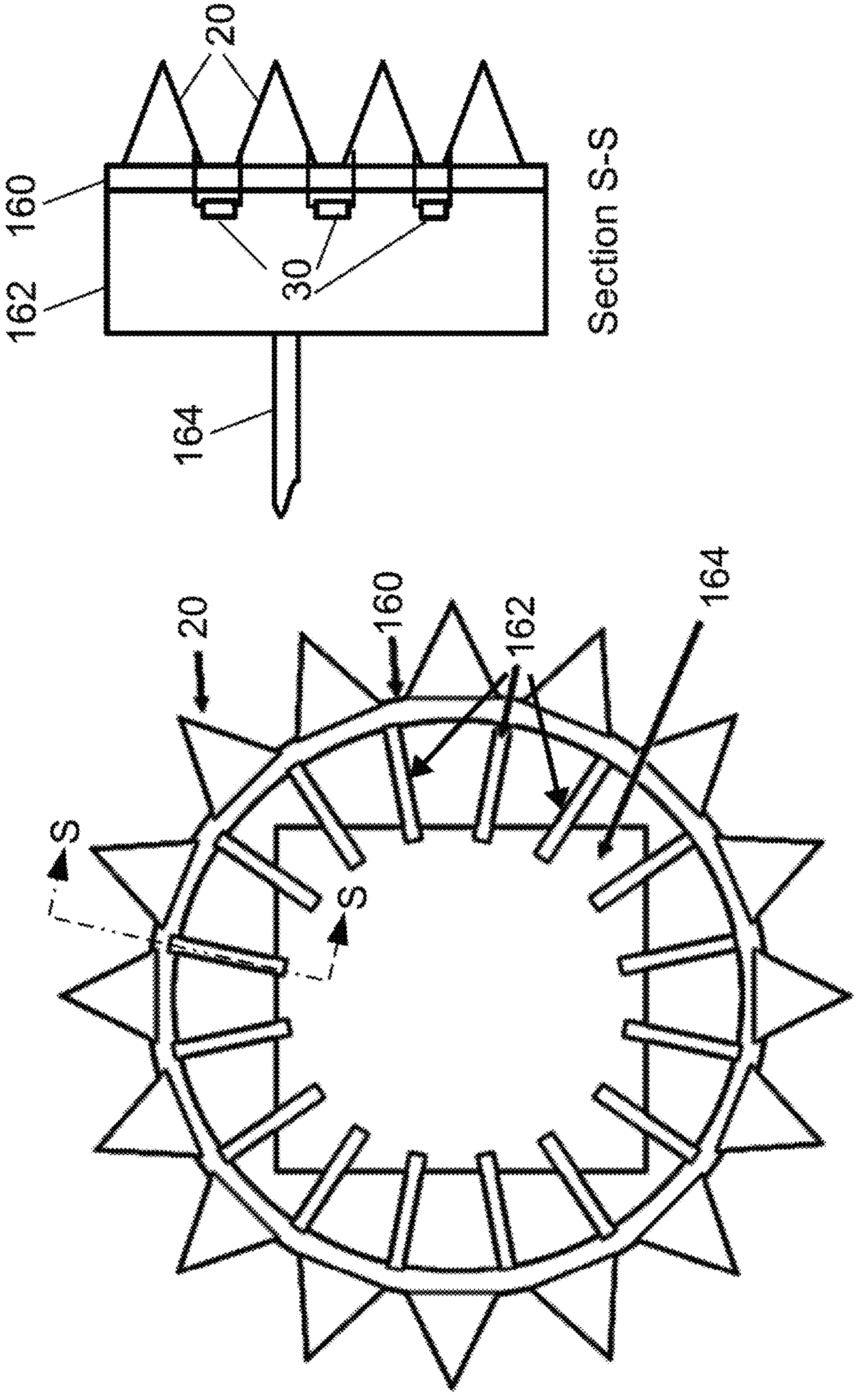
FIG. 18 shows another embodiment of a CADSA.

With reference now to FIG. 18, another cylindrical array of electrically conductive tapered projections (CADSA) embodiment is shown. In this embodiment, the electrically conductive tapered projections 20 are mounted on a cylindrical support 160 (e.g., a dielectric cylinder made of a plastic or another electrically non-conductive material) which forms the structural support for the RF aperture. The illustrative projections 20 are freestanding in this embodiment, and have their bases mounted on the cylindrical support 160. For example, the electrically conductive tapered projections 20 may be solid projections with threaded openings in their bases that are secured to the cylindrical support 160 by screws or other suitable threaded fasteners; or, the electrically conductive tapered projections 20 may be hollow projections secured via central posts inside the hollow projections; or the electrically conductive tapered projections 20 may be hollow projections whose bases are defined by base edges that are soldered or otherwise secured to the cylindrical support 160; or so forth. This is merely an illustrative example of a suitable cylindrical support; as another example, the cylindrical support may be such as the pair of semi-circular hollow shells 120 with the projections 20 supported between the inner and outer circumferential surfaces 122, 124 of the shells 120, as previously described with reference to FIG. 16.

In the embodiment of FIG. 18, the planar printed circuit boards 126, 140 of the embodiment of FIG. 16 are replaced by a set of radially oriented perpendicular printed circuit boards 162 whose planes lie parallel with radial lines extending outward from the cylinder axis of the cylindrical support 160. One edge of each radially oriented printed circuit board 162 is proximate to, and in some embodiments secured with, the inside surface of the cylindrical support 160. Each radially oriented perpendicular printed circuit board 162 is oriented perpendicular to the cylindrical support 160 at the edge proximate to the cylindrical support 160. A collector printed circuit board 164 is disposed inside the cylindrical support 160 and electrically coupled with the radially oriented perpendicular printed circuit boards 162. In a receive mode, RF signals captured by the projections 20 are conveyed via RF circuitry disposed on the radially oriented perpendicular printed circuit boards 162 to the collector printed circuit board 164, where they are ported off the RF aperture. In a transmit mode, an RF signal to be transmitted is delivered from the collector printed circuit board 164 to the projections 20 via the radially oriented perpendicular printed circuit boards 162. (It will be appreciated that a given RF aperture according to the design of FIG. 18 may be configured to operate as an RF receiver, or as an RF transmitter, or as an RF transceiver capable of both receive and transmit functionality). The electrical connections between the radially oriented perpendicular printed circuit boards 162 and the collector board 164 may be via coaxial cables (such as the coaxial cable 132 previously mentioned in reference to FIG. 16), or by electrical connectors or the like. It will also be appreciated that there may be one, two, or more collector boards 164, with more than one collector board being employed if needed to accommodate the RF circuitry. Furthermore, the radially oriented perpendicular printed circuit boards 162 may optionally be secured with the collector board(s) 164 to enhance structural support; having two or more collector boards 164 may be beneficial for enhanced structural support. Although not shown in FIG. 18, the top array of electrically conductive tapered projections (TADSA) 104 of FIG. 17 may optionally be used in conjunction with the embodiment of FIG. 18 for high elevation coupling.

One advantage of the design of FIG. 18 is that the radially oriented perpendicular printed circuit boards 162 are oriented perpendicularly to the cylindrical support 160 on which the electrically conductive tapered projections 20 are disposed. It is recognized herein that this configuration has an advantage as follows. The printed circuit boards that support the RF circuitry typically include ground planes, i.e. an electrically conductive sheet (e.g., a copper sheet) disposed inside or on a bottom of the printed circuit board. Such a ground plane is well known to have substantial benefits in RF circuitry performance. However, it is recognized herein that if the ground plane underlies the electrically conductive tapered projections 20, for example by being oriented parallel or close to parallel with the cylindrical support 160, then the ground plane can produce undesirable RF reflections that can interfere with performance of the RF aperture. By arranging the radially oriented perpendicular printed circuit boards 162 perpendicular to the cylindrical support 160, the ground planes of the radially oriented perpendicular printed circuit boards 162 are not underlying the projections 20. A further benefit of the arrangement of FIG. 18 is that, as seen in FIG. 18, the edge of each radially oriented perpendicular printed circuit board 162 contacting the cylindrical support 160 is positioned between two adjacent rows of electrically conductive tapered projections 20. This facilitates electrically connecting the two adjacent projections 20 in a differential manner (e.g. using the balanced port of a balun 30, as shown in Section S-S of FIG. 18) without lengthy coaxial cables 132 as are used in the embodiment of FIG. 16.

Figure 19:
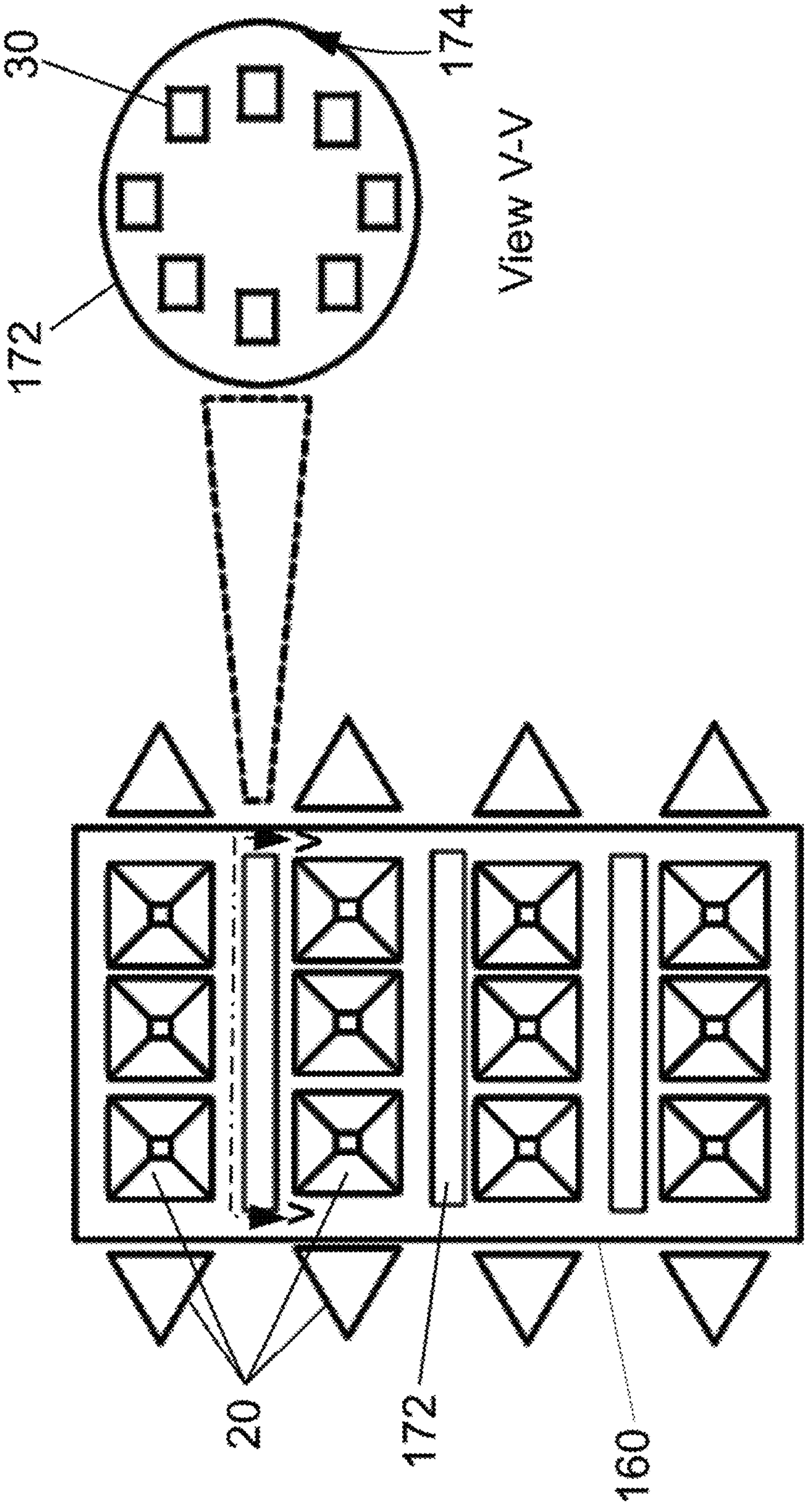
FIG. 19 shows another embodiment of a CADSA.

With reference to FIG. 19, another cylindrical array of electrically conductive tapered projections (CADSA) embodiment which employs perpendicular printed circuit boards is shown. The embodiment of FIG. 19 includes electrically conductive tapered projections 20 mounted to the cylindrical support 160 as already described with reference to FIG. 18. However, in the embodiment of FIG. 19, the radially oriented perpendicular printed circuit boards 162 and collector board(s) 164 of the embodiment of FIG. 18 are replaced by a set of perpendicular circular printed circuit boards 172, which are disposed concentrically inside the cylindrical support 160 and have circular perimeters 174 (i.e., circular edges 174; see View V-V of FIG. 19) that are proximate to, and in some embodiments secured with, the inside surface of the cylindrical support 160. The cylinder axis of the cylindrical support 160 is perpendicular to the circular printed circuit boards 172. This allows contact with the inside surface of the cylindrical support 160 around the entire 360° circular perimeter of the perpendicular circular printed circuit board 172, which facilitates structural robustness. Moreover, the circular perimeter of each perpendicular circular printed circuit board 172 is oriented perpendicularly to the cylindrical support 160 at the contact, which again mitigates the potential for the ground planes of the perpendicular circular printed circuit boards 172 to introduce RF reflections that might potentially produce RF interference during operation of the RF aperture of FIG. 19. By positioning each perpendicular circular printed circuit board 172 between two rings of projections 20, as seen in FIG. 19, differential electrical connection of two adjacent projections 20 is again facilitated, e.g. using the balanced ports of baluns 30 (shown diagrammatically in View V-V of FIG. 19). This again avoids the use of lengthy coaxial cables 132 as are used in the embodiment of FIG. 16. Although not shown in FIG. 19, the top array of electrically conductive tapered projections (TADSA) 104 of FIG. 17 may optionally be used in conjunction with the embodiment of FIG. 19 for high elevation coupling.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A radio frequency (RF) aperture comprising:

an array of electrically conductive tapered projections arranged to define a curved aperture surface that is conformal with a curved surface of a fuselage of an aircraft or unmanned aerial vehicle (UAV) or with a curved surface of a hull of a ship or submarine or with a curved surface of a satellite.

2. The RF aperture of claim 1 further comprising:

RF circuitry electrically connected with the electrically conductive tapered projections to receive and/or apply differential RF signals between neighboring pairs of electrically conductive tapered projections.

3. The RF aperture of claim 1 comprising:

at least one printed circuit board; and

RF circuitry disposed on the at least one printed circuit board and electrically connected with the electrically conductive tapered projections.

4. The RF aperture of claim 1 wherein the electrically conductive tapered projections are hollow.

5. The RF aperture of claim 1 wherein the electrically conductive tapered projections are solid.

6. A radio frequency (RF) aperture comprising:

an array of electrically conductive tapered projections arranged to define a cylinder aperture surface; and a top array of electrically conductive tapered projections arranged to define a top aperture surface.

7. The RF aperture of claim 6 wherein the array of electrically conductive tapered projections includes:

a first array of electrically conductive tapered projections arranged to define a first semi-cylinder aperture surface; and a second array of electrically conductive tapered projections arranged to define a second semi-cylinder aperture surface;

wherein the first and second semi-cylinder aperture surfaces are mutually arranged to define the cylinder aperture surface.

8. The RF aperture of claim 6 wherein the top aperture surface is a planar top aperture surface.

9. A radio frequency (RF) aperture comprising:

an array of electrically conductive tapered projections arranged to define a curved aperture surface defining a 360° aperture; and RF circuitry disposed inside the curved aperture surface defining the 360° aperture and electrically connected with the electrically conductive tapered projections to receive and/or apply differential RF signals between neighboring pairs of electrically conductive tapered projections;

wherein the array of electrically conductive tapered projections includes a first array of electrically conductive tapered projections arranged to define a first curved aperture surface, and a second array of electrically conductive tapered projections arranged to define a second curved aperture surface; and wherein the first and second curved aperture surfaces are mutually arranged to define the curved aperture surface defining the 360° aperture.

10. A radio frequency (RF) aperture comprising:

an array of electrically conductive tapered projections arranged to define a curved aperture surface defining a 360° aperture;

a pole at an end of the curved aperture surface defining the 360° aperture and supporting the array of electrically conductive tapered projections; and RF circuitry disposed inside the curved aperture surface defining the 360° aperture and electrically connected with the electrically conductive tapered projections to receive and/or apply differential RF signals between neighboring pairs of electrically conductive tapered projections.

11. The RF aperture of claim 10 further comprising:

a top array of electrically conductive tapered projections arranged to define a top aperture surface.

12. The RF aperture of claim 11 wherein the top aperture surface is a planar top aperture surface.

13. A radio frequency (RF) aperture comprising:

an array of electrically conductive tapered projections arranged to define a cylindrical aperture surface defining a 360° aperture; and RF circuitry disposed inside the cylindrical aperture surface defining the 360° aperture and electrically connected with the electrically conductive tapered projections to receive and/or apply differential RF signals between neighboring pairs of electrically conductive tapered projections.

* * * * *